(12) United States Patent
Tashkandi et al.

(10) Patent No.: US 12,265,802 B2
(45) Date of Patent: Apr. 1, 2025

(54) APPARATUS AND METHOD FOR DIGITAL PLATFORMS TWINS GENERATION

(71) Applicant: SAUDI ARABIAN OIL COMPANY, Dhahran (SA)

(72) Inventors: AlAlaa N. Tashkandi, Dhahran (SA); Ali H. Khatam, Dhahran (SA); Dlaim M. Qahtani, Dhahran (SA); Turki I. Mohammed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 173 days.

(21) Appl. No.: 18/300,980

(22) Filed: Apr. 14, 2023

(65) Prior Publication Data

US 2024/0345812 A1 Oct. 17, 2024

(51) Int. Cl.
G06F 8/36 (2018.01)

(52) U.S. Cl.
CPC ...................... G06F 8/36 (2013.01)

(58) Field of Classification Search
USPC ........................................... 717/106
See application file for complete search history.

(56) References Cited

U.S. PATENT DOCUMENTS

| | | |
|---|---|---|
| 7,590,660 B1 | 9/2009 | Richards et al. |
| 7,739,680 B1 | 6/2010 | Thakur et al. |
| 7,885,922 B2 | 2/2011 | Pareek et al. |
| 10,007,584 B2 | 6/2018 | Grimm et al. |
| 10,114,565 B2 | 10/2018 | Nithrakashyap et al. |
| 10,235,090 B1 | 3/2019 | Baruch et al. |
| 10,379,845 B2 | 8/2019 | Parees et al. |
| 10,452,374 B2 | 10/2019 | Sapaliga et al. |

(Continued)

FOREIGN PATENT DOCUMENTS

| | | |
|---|---|---|
| CN | 103701924 A | 4/2014 |
| JP | 4620784 B2 | 1/2011 |

OTHER PUBLICATIONS

"Announcing Azure Digital Twins: Create Digital Replicas of Spaces and Infrastructure Using Cloud, AI and IoT"; Microsoft Azure Website Blog (azure.microsoft.com) [full URL included in ref.]; Sep. 24, 2018 (Year: 2018).*

(Continued)

Primary Examiner — Bradley A Teets
Assistant Examiner — Clint Thatcher
(74) Attorney, Agent, or Firm — Leason Ellis LLP

(57) ABSTRACT

A platform as a service ("PaaS") automation engine receives a request to generate a digital twin of a source computing system. The source computing system is mounted for on demand access to at least part of the source computing system. Parameter information representing aspects of the source computing system and the digital twin is accessed and application programming comprised in the source computing system is replicated. The replicated application programming is migrated to a digital twin staging store associated with the digital twin and provided to the digital twin. A delta between the replicated application programming and the source computing system is identified and the application programming of the digital twin is updated. Data associated with at least part of the source computing system are provided to the digital twin and the source computing system is unmounted.

20 Claims, 29 Drawing Sheets

(56) References Cited

U.S. PATENT DOCUMENTS

| | | | |
|---|---|---|---|
| 10,540,147 B2 | 1/2020 | Parees et al. | |
| 10,628,194 B2 | 4/2020 | Ryu et al. | |
| 10,776,329 B2 | 9/2020 | Ramohalli Gopala Rao et al. | |
| 11,016,738 B2 | 5/2021 | Hoffmann et al. | |
| 11,194,559 B2 | 12/2021 | Tashkandi | |
| 11,216,261 B1* | 1/2022 | Moyal | G06F 9/455 |
| 11,422,731 B1* | 8/2022 | Potashnik | G06F 11/2094 |
| 2006/0047720 A1 | 3/2006 | Kulkarni et al. | |
| 2015/0222705 A1 | 8/2015 | Stephens | |
| 2015/0242197 A1 | 8/2015 | Alfonso et al. | |
| 2020/0304375 A1* | 9/2020 | Chennai | G06V 20/10 |
| 2021/0042104 A1* | 2/2021 | Tashkandi | G06F 8/77 |
| 2021/0133073 A1 | 5/2021 | Reineke et al. | |
| 2021/0248251 A1* | 8/2021 | DeLuca | G06F 21/6218 |
| 2021/0303687 A1* | 9/2021 | Pendlebury | G06F 21/6218 |
| 2024/0193146 A1* | 6/2024 | Bentley | G06F 9/45558 |

OTHER PUBLICATIONS

"Digital Twins: Components, Use Cases, and Implementation Tips"; Altexsoft.com blog page [full URL included in ref.]; Sep. 15, 2021 (Year: 2021).*

* cited by examiner

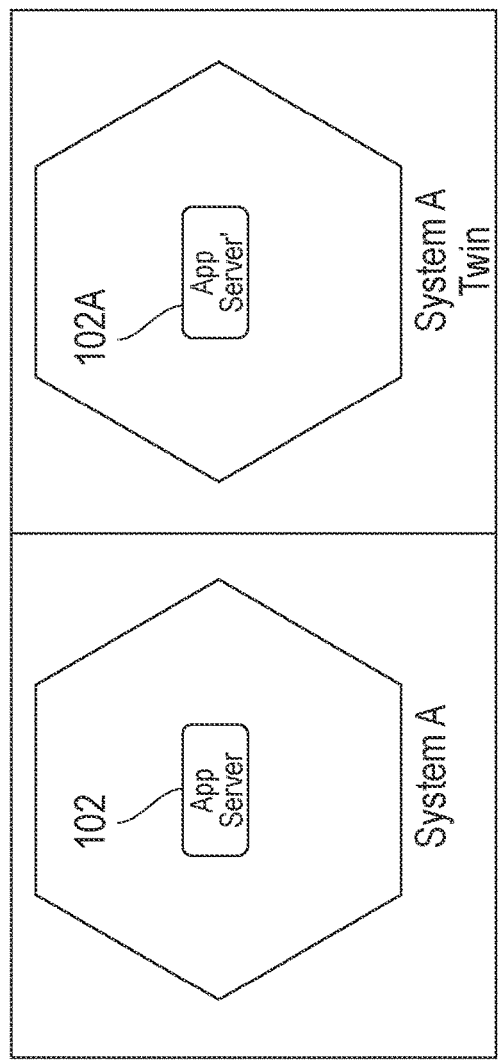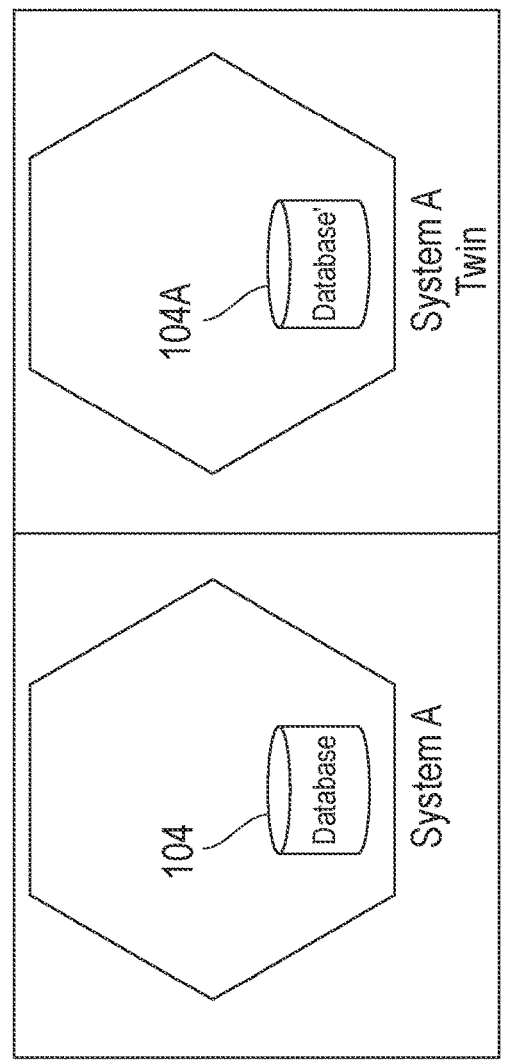
FIG. 5
FIG. 6

APPARATUS AND METHOD FOR DIGITAL PLATFORMS TWINS GENERATION

FIELD OF THE DISCLOSURE

The present invention relates, generally, to large-scale computing systems management and, more particularly, to systems and methods implementing platform as a service-based digital twin generation and use.

BACKGROUND OF THE DISCLOSURE

Large digital platform systems, such as for enterprise resource planning ("ERP"), supply chain management, and customer relationship management ("CRM"), host mission critical solutions and data and need to be operational and accessible continuously. In order to maintain full time operations of digital core systems in production environments, updates to digital core systems, including to roll out new services and features, are often made in an offline (e.g., a development) environment to prevent interference with operation and availability of a production system. Accordingly, working backup systems of one or more digital core systems (referred to herein, generally, as one or more "digital twins") can be implemented via system cloning, system replication, system copying, or other suitable technique.

Operations associated with digital twin processing can include parallel transactions load balancing, installing or upgrading patches, conversions, training implementations, or to roll out new innovations. Unfortunately, digital twin generation carries various shortcomings. For example, performance and availability of one or more production systems can be impacted negatively during digital twin generation. Further, digital twin generation is often limited to homogenous computing environments and relies on manual processes, for example, by following procedures and steps by a system analyst.

It is respect to these and other concerns that the present disclosure is made.

BRIEF SUMMARY

In one or implementations of the present disclosure, a system and method are provided for automating generation of a digital twin of an enterprise-wide information technology platform. A request to generate a digital twin of a source computing system can be received at a platform as a service ("PaaS") automation engine over a network. The PaaS automation engine can mount the source computing system for on demand access to at least part of the source computing system. The PaaS automation engine accesses parameter information representing aspects of the source computing system and the digital twin and, by processing the parameter information, can replicate at least application programming comprised in the source computing system. In addition, the PaaS automation engine migrates the replicated application programming to a digital twin staging store associated with the digital twin. The PaaS automation engine provides the replicated application programming to the digital twin. In addition, by processing the parameter information, the PaaS automation engine can identify a delta between the replicated application programming and the source computing system. By processing the delta, the PaaS automation engine can update the application programming of the digital twin. In addition, the PaaS automation engine can provide data associated with at least part of the source computing system to the digital twin, and unmount the source computing system.

In one or more implementations of the present disclosure, the PaaS automation engine can access an automation engine artifacts store that provides at least one of repositories of software packages, components, templates, parameters, and status information associated with at least one of the source computing system and the digital twin, wherein replicating the application programming includes extracting the application programming, by the PaaS automation engine, from at least one of the software packages.

In one or more implementations of the present disclosure, the PaaS automation engine can access at least one of the templates provided by the automation engine artifacts store and process the at least one of the templates to generate the digital twin, wherein at least one of the parameters represents or is associated with the delta.

In one or more implementations of the present disclosure, the PaaS automation engine can determine a size of at least one of the software packages, components, templates, parameters, and status information associated with the source computing system. The PaaS automation engine can identify capacity of a target host of the digital twin and determine that the target host has sufficient capacity to host the digital twin, wherein the replicated application programming is only provided by the PaaS automation engine to the digital twin after determining that the target host has the sufficient capacity.

In one or more implementations of the present disclosure, the PaaS automation engine can determine that executing the replicated application programming with an existing or executing component of the digital twin or a target host of the digital twin presents no conflict, wherein the replicated application programming and the data is only provided by the PaaS automation engine to the digital twin after determining no conflict.

In one or more implementations of the present disclosure mounting the source computing system for on demand access comprises accessing, by the PaaS automation engine, the parameter information provided by the automation engine artifacts store and passing, by the PaaS automation engine, the parameter information to a host agent associated with the source computing system, wherein the host agent uses the parameter information to provide the on demand access from the source computing system.

In one or more implementations of the present disclosure migrating the replicated application programming and providing the data comprises migrating an application server to the digital twin and independently migrating a database server to the digital twin.

In one or more implementations of the present disclosure the source computing system is physically hosted and the digital twin is virtually hosted, the source computing system is virtually hosted and the digital twin is physically hosted, or the source computing system is cohosted on a plurality of computing devices.

In one or more implementations of the present disclosure, the PaaS automation engine can provide to the digital twin staging store, via at least one respective connector, at least one of environment variables, configuration files, source system files structure, database topology, database metadata, database change number, and database data files.

In one or more implementations of the present disclosure the PaaS automation engine can replicate the digital twin by mounting the digital twin for on demand access to at least part of the digital twin. Further, the PaaS automation engine can access parameter information representing aspects of the digital twin and replicate, by processing the parameter information, at least application programming comprised in the digital twin. Further, the PaaS automation engine can migrate the replicated application programming to at least one other digital twin staging store associated with another digital twin and provide the replicated application programming to the at least one other digital twin. Still further, the PaaS automation engine can identify, by processing the parameter information, a delta between the replicated application programming and the digital twin and update by processing the delta, the application programming of the at least one other digital twin. The PaaS automation engine can provide data associated with at least part of the digital twin to the at least one other digital twin and unmount the digital twin.

Other features of the present disclosure are shown and described herein.

BRIEF DESCRIPTION OF THE FIGURES

Aspects of the present disclosure will be more readily appreciated upon review of the detailed description of its various embodiments, described below, when taken in conjunction with the accompanying drawings, of which:

FIGS. 5 and 6 illustrate steps associated with a full or partial migration, in accordance with an example implementation of the present disclosure;

DETAILED DESCRIPTION OF ONE OR MORE EMBODIMENTS

Figure 1:
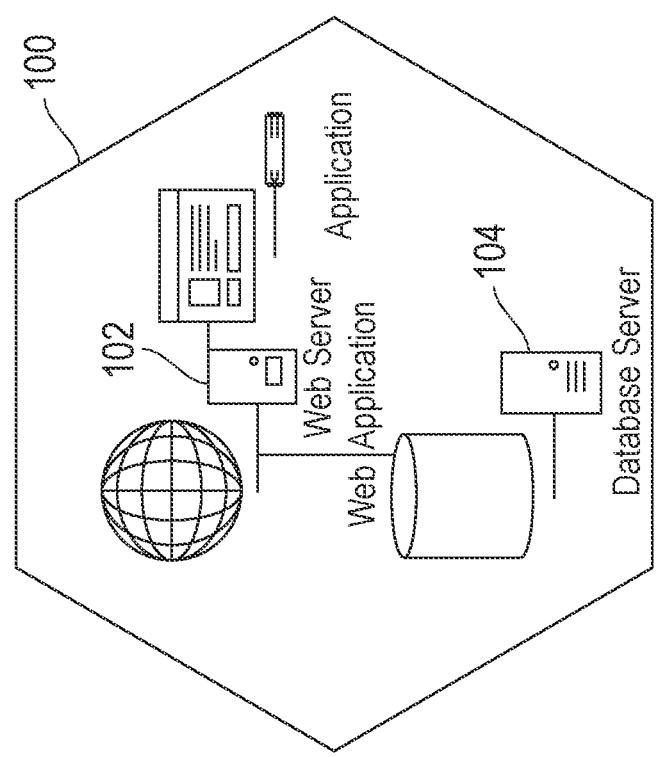
FIG. 1 is a block diagram illustrating an example source computing system and associated components in accordance with an example implementation of the present disclosure.

By way of summary and introduction, systems and methods include generating one or more digital twins having identical or semi-identical characteristics of a source digital platform system. For example, a digital twin a of source ERP digital platform is generated using technologies shown and described herein, including database systems, application systems, multi-components systems, or the like. For example, the present disclosure leverages automation control via Platform as a Service ("PaaS"), such as shown and described in co-assigned U.S. Pat. No. 11,194,559 and which is incorporated by reference as if expressly set forth herein. PaaS automation can be configured to migrate virtualized computing systems to physical computing systems, or vice versa. Moreover, PaaS automation provides for migration across different computing platforms and environments that otherwise would be incompatible and not supported. For example, PaaS automation configured in accordance with the present disclosure enables improved digital twin cloning of computing platforms that rely on proprietary technologies, such as one or more specific hypervisor virtualizations, container clusters (e.g., OPENSHIFT), or other technologies.

Implementations of the present disclosure can include PaaS configurations to generate one or more digital twins to and from one or more respective physical and/or cloud-based computing environments. For example, a source electronic medical record ("EMR") system is migrated to a cloud-based digital twin. The PaaS automation control-based digital twin generation system and method of the present disclosure includes a modular computer-based design that supports extendibility and orchestration of digital twin generation and migration. Implementations having a modular design are particularly suited for providing data analytics associated with digital twins and associated environments, without imposing more than minimal impact on live production systems.

A wide variety of platforms can be supported including, without limitation, combinations of virtualized and physical appliances. For example, PaaS automation control provided by the present disclosure extends digital twin creation and use to container-based solutions. Such solutions provide improved flexibility, including to support imaging of complex systems. In addition, operations executing as a function of PaaS automation control can provide for new and improved methods of generating disaster recovery ("DR") and standby systems, including via automatic operations that customize and support integration of differentiated twins and ecosystems. PaaS automation control can be provided, for example, for digital platforms cloning. ERP systems deployment, generation and use of migration and standby systems, enterprise database systems replication, and DR management, and heterogenous cloud-based systems migration.

Furthermore, the present disclosure includes augmenting PaaS automation control with a digital twin staging store that is usable to optimize storage clone simulation. In addition, the present disclosure includes an enhanced automation engine artifacts store, which can include components, data, templates, and information associated with source systems and digital twins. For example, components in an automation engine artifacts store can include repositories of software packages, PaaS metrics, PaaS events, status information of digital twins, and digital twin templates. Components can be distributed via PaaS automation control to one or more hosts (e.g., source hosts and digital twin hosts). In addition, one or more digital twin staging stores can be provided and used in source and target computing devices for implementing digital twins and executing operations thereon, which further mitigates operational disruptions in source application processes. The present disclosure further includes seamless operations that can be included in existing systems and precludes interruptions that would occur such as in environments that use storage snapshot simulation and other technologies. Moreover, techniques for events monitoring can be defined in a PaaS automation engine and stored in an automation engine artifacts store, including in a multi-cloud environment. As used herein, a "PaaS automation Engine," generally, can trigger operations on PaaS systems, hosts or containers. Multiple operations can be modeled and connected, such as through predecessor and successor relationships to form a process. Complex automation activities, such as providing for twin generation, can be modeled using process definitions. Operations and processes via a PaaS Automation Engine can be defined as abstract operations and processes, without being linked to specific servers or systems, unless explicitly specified. Once defined, a user can trigger the operation or process in specific instances.

Technical improvements over conventional technologies, including in parallel twin generation and use, are provided by the present disclosure. For example, exclusive dependency on particular and proprietary virtualization and mirroring technologies for clone generation can be eliminated. Furthermore, the present disclosure provides for multi-cloud migration via PaaS automation control, including for generating and using identical or semi-identical source and target digital twins, even when such source or target systems are hosted on different platforms.

One or more systems of the present disclosure can include web-based database operations that include client tools, such as applications having an interactive graphical user interface via web browsers. An interface can provide client devices with interactive graphical screen controls for accessing and sending information to and from one or more server devices. Client devices can be configured with direct access to a database for faster data access, such as in a 3-tier or 2-tier system, although additional tiers for external uses and zoning can be provided. Accordingly, enterprise systems including platforms, for example, for supply chain management, customer relationship, finance & accounting, human resources, business intelligence, operations, and security platforms, to name but a few, are supported and can be integrated in implementations that provide PaaS digital twin platforms generation and use.

FIG. 1 is a block diagram illustrating an example source computing system and associated components 100 in accordance with an example implementation of the present disclosure. The system 100 shown in FIG. 1 can be, for example, operational systems that are in production in the enterprise. As shown in FIG. 1, various computing aspects in system 100 include an application server 102 and a database server 104, as well as applications (including a web-based application) and a database.

Figure 2:
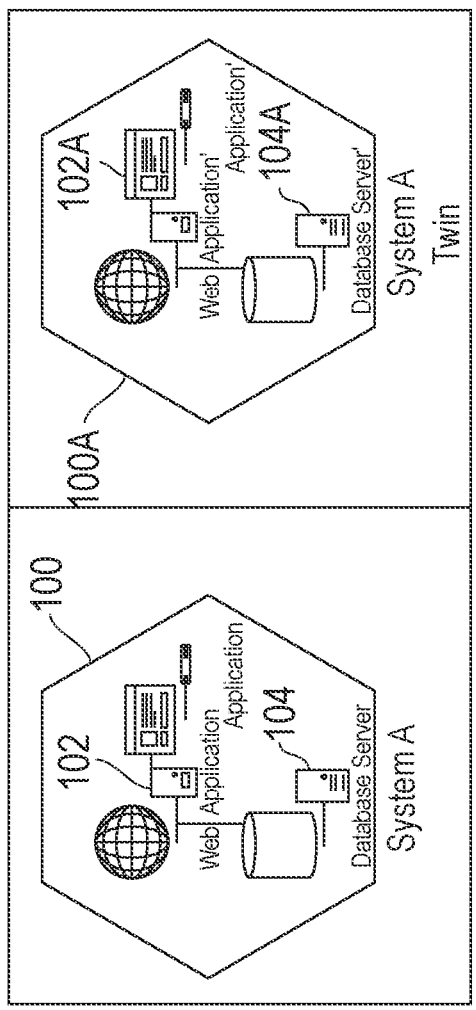
FIG. 2 illustrates an example source computing system and a corresponding digital twin.
Figure 3:
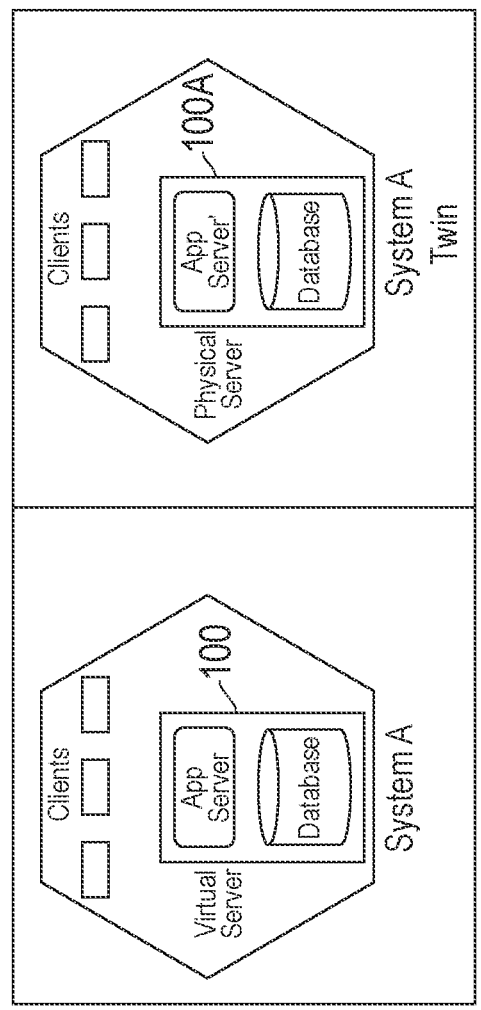
FIG. 3 illustrates source and target database and application servers, in accordance with an example implementation of the present disclosure.

FIG. 2 illustrates an example computing system and associated components 100 shown in FIG. 1, and include application server 10 and database server 104. In addition, digital twin 100A is illustrated, including application server' 102A, database server 104A that can be hosted on one or more physical or virtual servers or distributed among multiple servers. FIG. 3 illustrates source and target database and application servers, in accordance with an example implementation of the present disclosure.

Once configured, a PaaS-based digital twin 100A can be updated with applications, such as to introduce new functionality, as well as to remove or decommissioning part of one or more systems, which could otherwise lead to undesirable side effects that impact business continuity. Creating and using a digital twin 100A in accordance with the present disclosure mitigates risks, such as those associated with maintenance and life cycle management of respective systems. For example, updates and new functions can be simulated in cloned twins, thereby avoiding a need for such changes from being applied directly in production environments and raising risk of operational interruptions.

Figure 4:
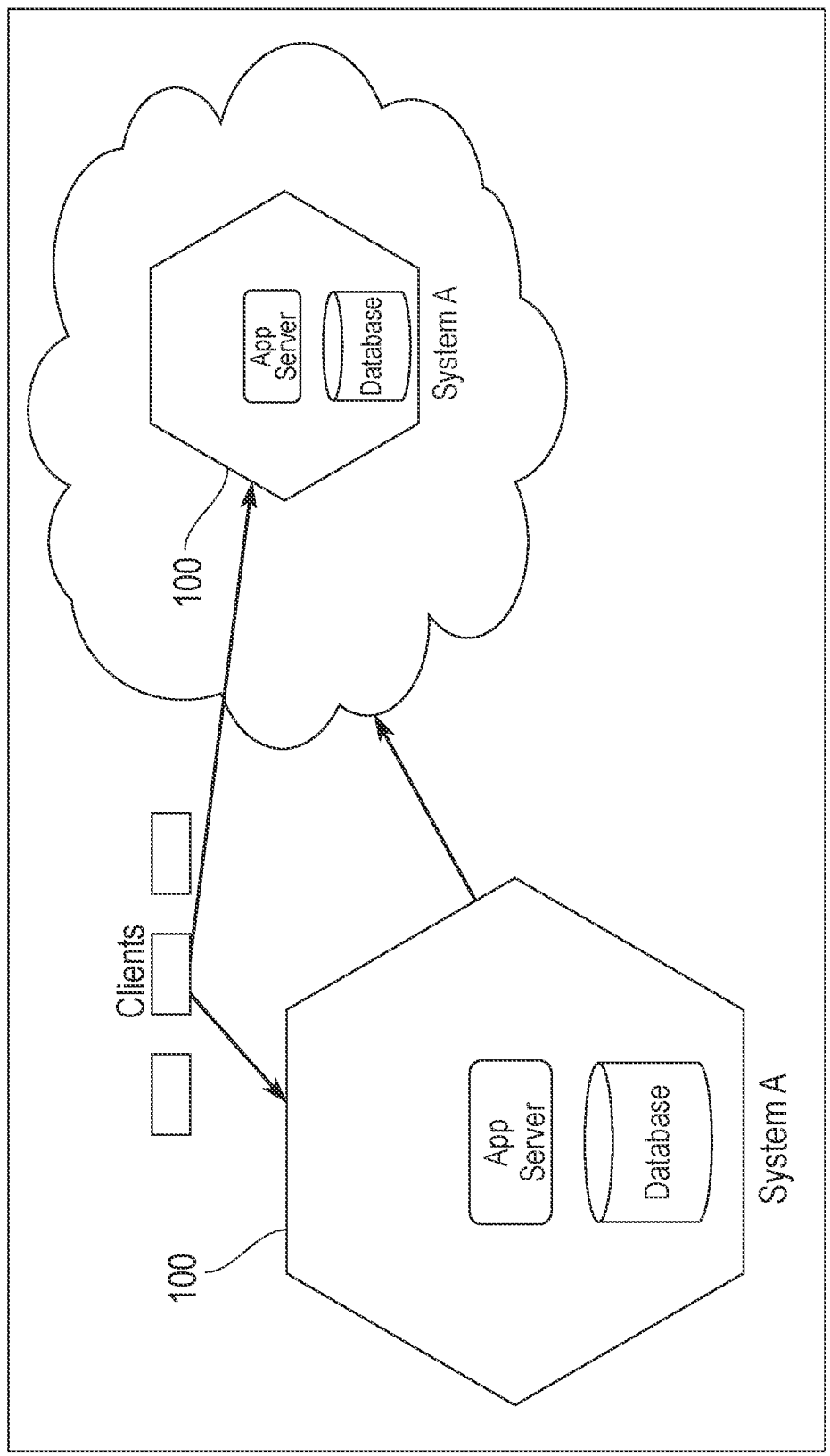
FIG. 4 illustrates an example process of migrating a data center and app server from physical hosted environment to a cloud-based hosted environment in accordance with a PaaS implementation.

Production systems such as those shown and described herein, can be hosted in local datacenters, cloud datacenters, or combinations thereof. One of ordinary skill will recognize that such systems have respective life cycles. PaaS-based digital twin generation and use in accordance with the present disclosure supports altering hosting of production systems during respective life cycles in physical or virtual computing systems, as well as between datacenters, different virtualization technologies, and from an on-premises datacenter to a cloud datacenter. FIG. 4 illustrates an example process of migrating a computing system 100 from a physical hosted environment to a cloud-based hosted environment in accordance with a PaaS implementation. As illustrated, client computing devices interact with both physical hosted and remote, cloud-based hosted environments seamlessly, in accordance with the teachings herein.

In one or more implementations, the migration process between different platforms with same endianness can be facilitated. The migration can be partial, for instance, by migrating an application server 102 and/or database server 104 independently, such as reflected in FIGS. 5 and 6. Furthermore, various heterogeneous digital twin production scenarios are supported.

Accordingly, support for digital twin production in various configurations and contexts can be provided in accordance with the present disclosure. In various implementations, source system configurations may be considerably complex, including multiple cohosted or distributed servers. As used herein, "cohosted" refers, generally, in association with application servers, which can represent a software unit that provides application or applications to one or more clients and can be stateful or stateless. Application servers can be accessible through a network via a specific protocol and port. An application server can be hosted in a container, a virtual machine or a physical machine. Moreover, cohosting application servers refers, generally, installing and running multiple application servers units in one container, virtual machine or physical server. Application servers can be stopped and started as independent units, unless a specific dependency or relationship were to be enforced. In computing environments, where provisioning new servers to host new applications or database system is a lengthy process or not feasible due to resource limitation, an administration team can cohost, such as to install multiple database systems or application servers within the same physical or virtual server.

Furthermore, an end user can connect to different application servers or database systems cohosted in one server reachable by a specific IP address using a port assigned to each application server or database system. Cohosting can be particularly useful when a HPC server has excess capacity and reducing idle resources is required. Still further, cohosting can refer, generally, to different components of a system within the same server. For example, two application servers serving the same solution with a database can be within the same virtual machine or physical server. Another reason for having multiple application servers for the same solution with the same host can be to minimize interruption when patching the application server. For example, an application server requires patching, and one application server is evicted from the system while another is available to serve users. The evicted server can be maintained or patched and, thereafter, returned to operation. In such setup, a load balancer can be placed in front of the application servers and reached by the assigned ports. In accordance with one or more implementations of the present disclosure, during digital twin generation may not require two application servers for simulating a specific workload, as just one application server can be satisfactory. In such case, a semi-identical twin can be generated without impacting the functionality of the solution in the target environment. On the other side, the opposite can be required, and multiple application servers are cohosted in the digital twin server, such as to satisfy a specific test requirement. The source of these application servers is one application server.

Figure 7:
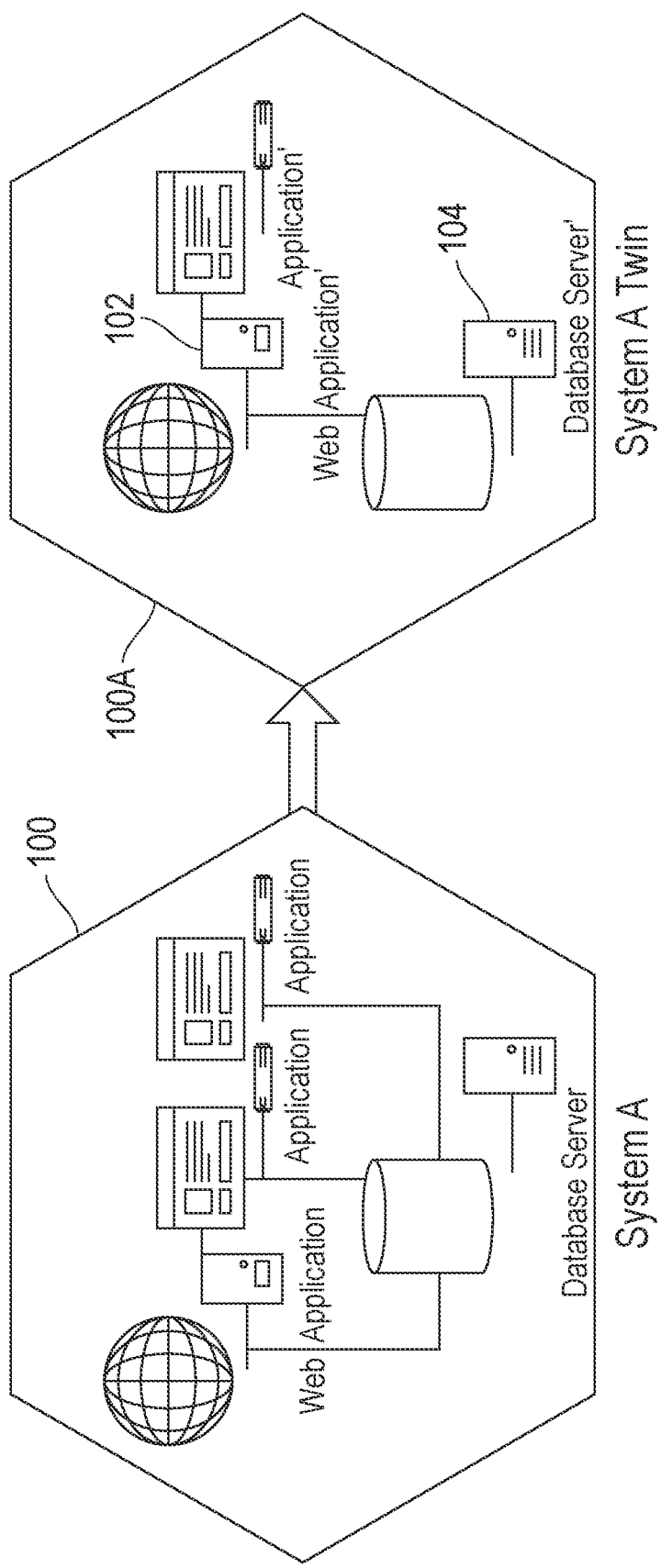
FIG. 7 represents an example implementation including semi-identical twin production from a source system, in accordance with an example implementation of the present disclosure.
Figure 8:
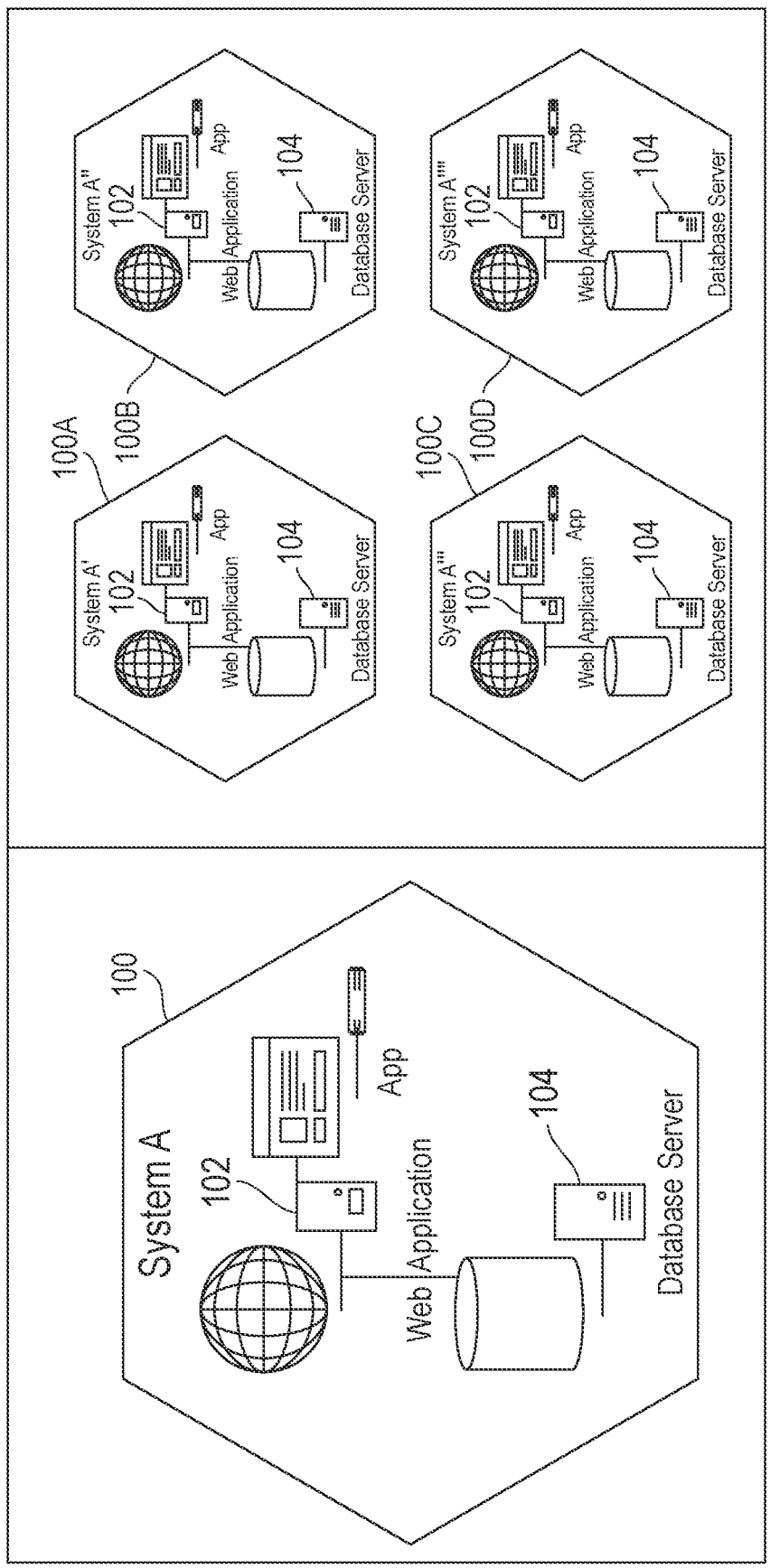
FIG. 8 illustrates producing multiple twins, for example, in parallel from a live source system, in accordance with an example implementation of the present disclosure.

In certain implementations, digital twin computing environments may not support such complex architectures. In such case or for other implementation-specific reasons, a semi-identical (as opposed to an identical) digital twin system 100A can be generated. An implementation showing semi-identical twin production is represented in FIG. 7. Moreover, the present disclosure supports producing multiple digital twin systems 100A, 100B, 100C, and 110D in parallel, for example, from a live source system, such as represented in FIG. 8. In the example shown in FIG. 8, each twin can be configured for operating in different conditions or for different purposes, such as for experimentation, evaluation, tuning, or other purposes. In addition, or in the alternative, identical conditions can be emulated by multiple twins for use by different sets of clients.

Accordingly, digital twins, clones, DR sites, or other configurations comprising replicas of one or more source systems can be achieved using PaaS automation control. For example, the present disclosure supports PaaS enhancement via digital twin staging, managing PaaS events, PaaS metrics, digital twin templates, and digital twin status functions to support cloning processes.

Figure 9:
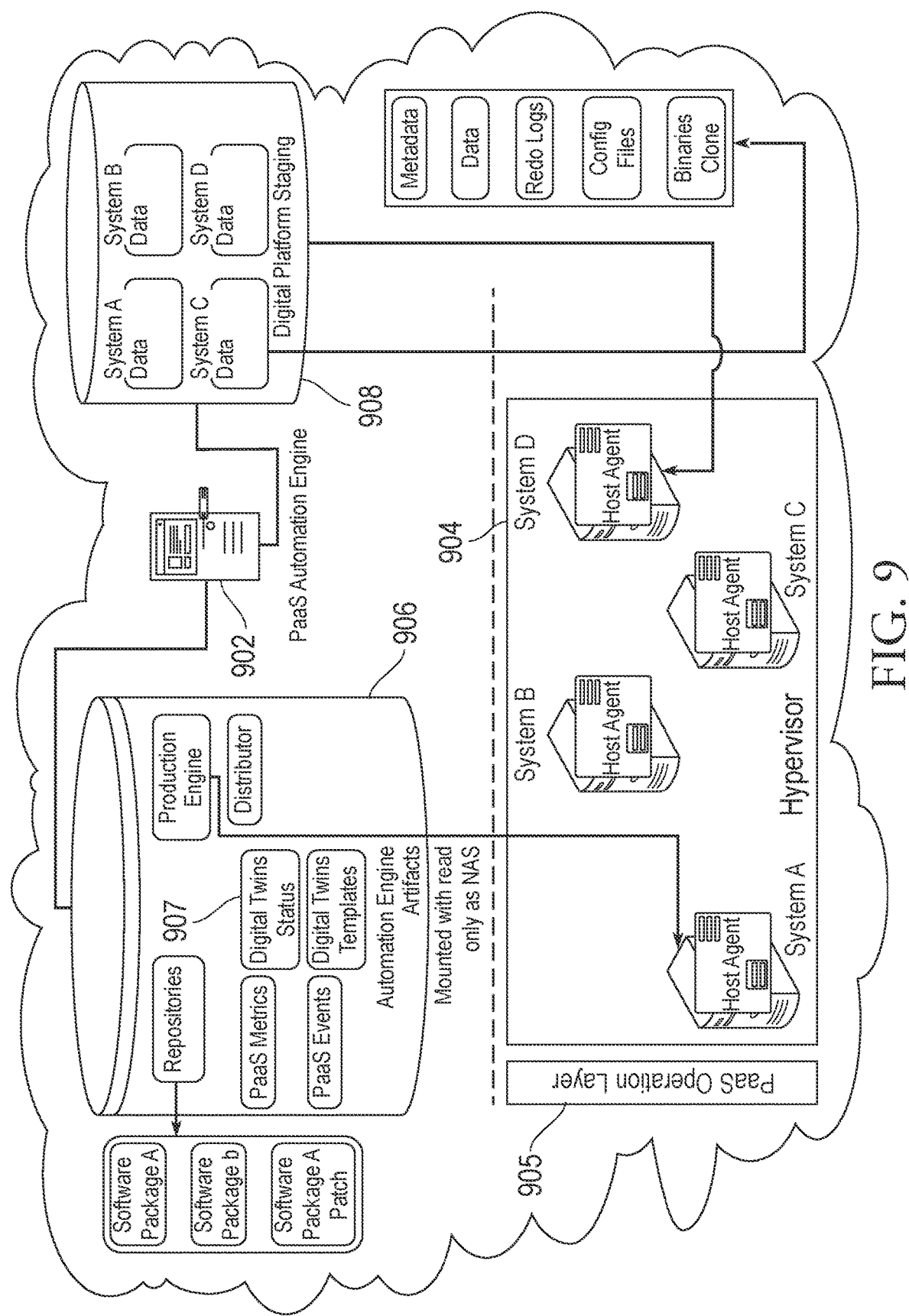
FIG. 9 illustrates a syncing process orchestrated by a PaaS automation engine, in accordance with an example implementation of the present disclosure.

FIG. 9 illustrates digital twin generation and digital twin staging, in accordance with an example implementation of the present disclosure. As shown in FIG. 9, PaaS automation engine 902 can be configured to orchestrate the syncing process. Source system section 904 includes a plurality of computing systems 100 ("System A," "System B," "System C," and "System D") and a PaaS operational layer 905. In the example shown in FIG. 9, System A is mounted with read-only access as network addressable storage ("NAS") and can be accessible by or stored in a digital twin automation engine artifacts store 906, including for use by a production engine via a distributor. Store 906 can include many components usable in PaaS-based digital twin production by the present disclosure, including for PaaS Metrics, PaaS events, identifying digital twin status (e.g., via digital twin status store 907), and generating digital twin templates. Repositories in store 906 can also include access to a plurality of software packages ("Software Package A" and Software Page B"), as well as patches and other software. In the example shown in FIG. 9, a patch for software package A ("Software Package A Patch") is provided.

Digital twins can be generated and hosted in digital twin staging store 908, including as System A Data, System B Data, System C Data, and System D Data. In the example shown in FIG. 9, System C Data is processed and includes metadata, data, redo logs, configuration files, and a binaries clone. Accordingly, PaaS automation engine 902 is augmented with digital twin staging store 908 to isolate code in platform images, and data extracted from the source are stored in other digital platform network storage In case of a clone, for example, after restoring a database from an online backup, redo logs can be replayed to apply the most recent database transactions that were committed during and after the backup. Redo logs can be used in case of an online backup or in case the state of digital twin database is to be synced to a specific point-in-time. Accordingly, PaaS automation engine 902 can be augmented with digital twin staging store 908 to have dedicated high performance read/write network attached storage, which allows fast replication of multi-terabytes to destination digital twins. On the other hand, the automation engine artifact store 906 can be used for reading by source and destination servers. PaaS automation Engine 902 can update contents of a respective automation engine artifact store 906 and maintains its integrity. For example, codes, software packages, templates, PaaS statuses and automation artifacts can be stored in platform images (or automation engine artifact store) and digital twin cloning data and metadata are staged in a digital twin staging area. Further enhancements supported is implemented at least in part by include replicating engine components locally in the target hosts and providing mounting function on demand for an automation engine artifacts store.

Figure 10:
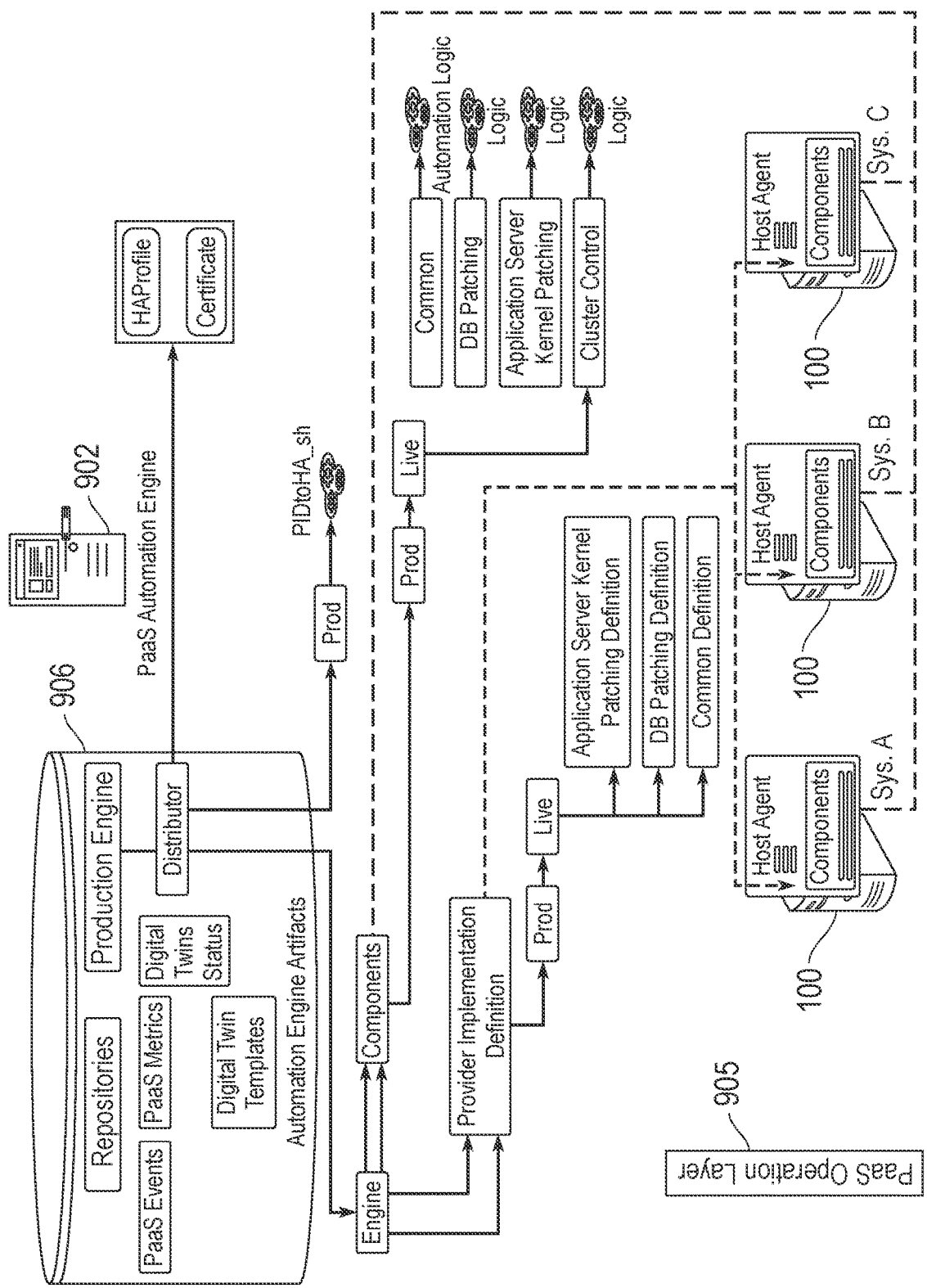
FIG. 10 illustrates a distribution of automation artifacts to local engines, including components and definitions in addition to mounting of automation engine artifact store, in accordance with an example implementation of the present disclosure.

Referring now to the example implementation shown in FIG. 10, a mounting function is implemented in PaaS automation engine 902, including by providing associated components and definition artifacts. Recognizing that availability of network storage is not always guaranteed, mounting functions in accordance with the present disclosure can be restricted to required paths, as opposed to all paths, of an automation engine artifact store 906. For example, during one or more component replication processes only one sub-path (e.g., "Production Engine") is mounted on a target server computing device. In the example shown in FIG. 10, the engine component is called locally, as opposed to called from remote storage. A replication method can be developed to securely rollout local engine updates, including using checksum or other suitable method. In operation, associated provider implementation definitions for various components can include the new path, once released from the factory and deployed in production engine automatically As used herein a component can refer to a program or script that can be executed by a server or container, such as written in PYTHON, JAVA, or other language supported in the server. A replication process can be implemented using multiple automation components that can be maintained centrally, for example, in automation engine artifact store 906 and synced to local engines. The process can include mounting automation engine artifact store 906 component, and replicating components and artifacts to standard local path component. Other process steps can include syncing automation definitions to local path component, and unmounting of automation engine artifact store 906 using the same previously used component, which can be customized and distinguished by parameters.

In one or more implementations, mount component parameters can define specifications of shared storage of automation engine artifact store 906, such as the mount options and a network file sharing ("NFS") server. If a process is initiated by PaaS automation engine 902 by an event or scheduled job, the mount component called the target host by, for example, a host agent. One or more parameters can be passed as arguments to the component in the target host which is stored in the automation engine artifact store 906 to execute code and operating system commands.

In one or more implementations of the present disclosure, components in automation engine artifact store 906 can be associated with definitions. Definitions, such as associated with mount component, can provide information for executing the component, the location of the component, the parameters of the component, description of its function and supported operating system to execute the automation artifact. Following a successful mount, one or more custom components can be executed from a shared automation engine artifact store 906. Components from shared storage can be replicated to local automation engine artifact store 906. For example, in one or more implementations of the present disclosure, components can be synchronized to a local automation engine artifact store 906 and checksums can be verified to confirm definitions and components are correct. After a definition is updated, an associated component checksum can be verified, such as based on referenced whitelisted checksums available in automation engine artifact store 906 or otherwise accessible, such as via an API from a remote system. In case the checksum does not match the calculated checksum, the process is stopped and an alert is sent.

In addition to a mount operation, an unmount operation can be executed using the same mount component and definition and passing a different parameter value (e.g., 0 for unmount and 1 for mount).

The local automation engine artifact store 906 can be also prepared as part of virtual server provisioning. Once provisioned, a NFS server can be mounted as a post activity. Alternatively, delegated privileged commands can be used for existing hosts not yet configured with local automation engine artifact store 906 to be integrated with PaaS automation engine 902.

In one or more implementations of the present disclosure, a digital twin status store 907 can be included in a digital twin automation engine artifacts store 906. Information representing the status of a digital twin and/or digital twin staging store 908, including twin production conditions and operations, past and present digital twin systems configurations and data, can be stored in a digital twin status store, for example, in JSON data format. PaaS automation engine 902 can operate on information in a digital twin status store, including to update data periodically and dynamically in digital twin staging store 908. In one or more implementations, data in the digital twin status store can include data that includes a twin production id, source system id, source system name, associated source hosts, target twins, target twin id, name, associated twin hosts, generation date, digital twin status (e.g., representing active, generation in process, to be decommissioned, and decommissioned), source database size at production date, generation date, and parameter delta (e.g., application server 102 and database server 104).

Figure 11:
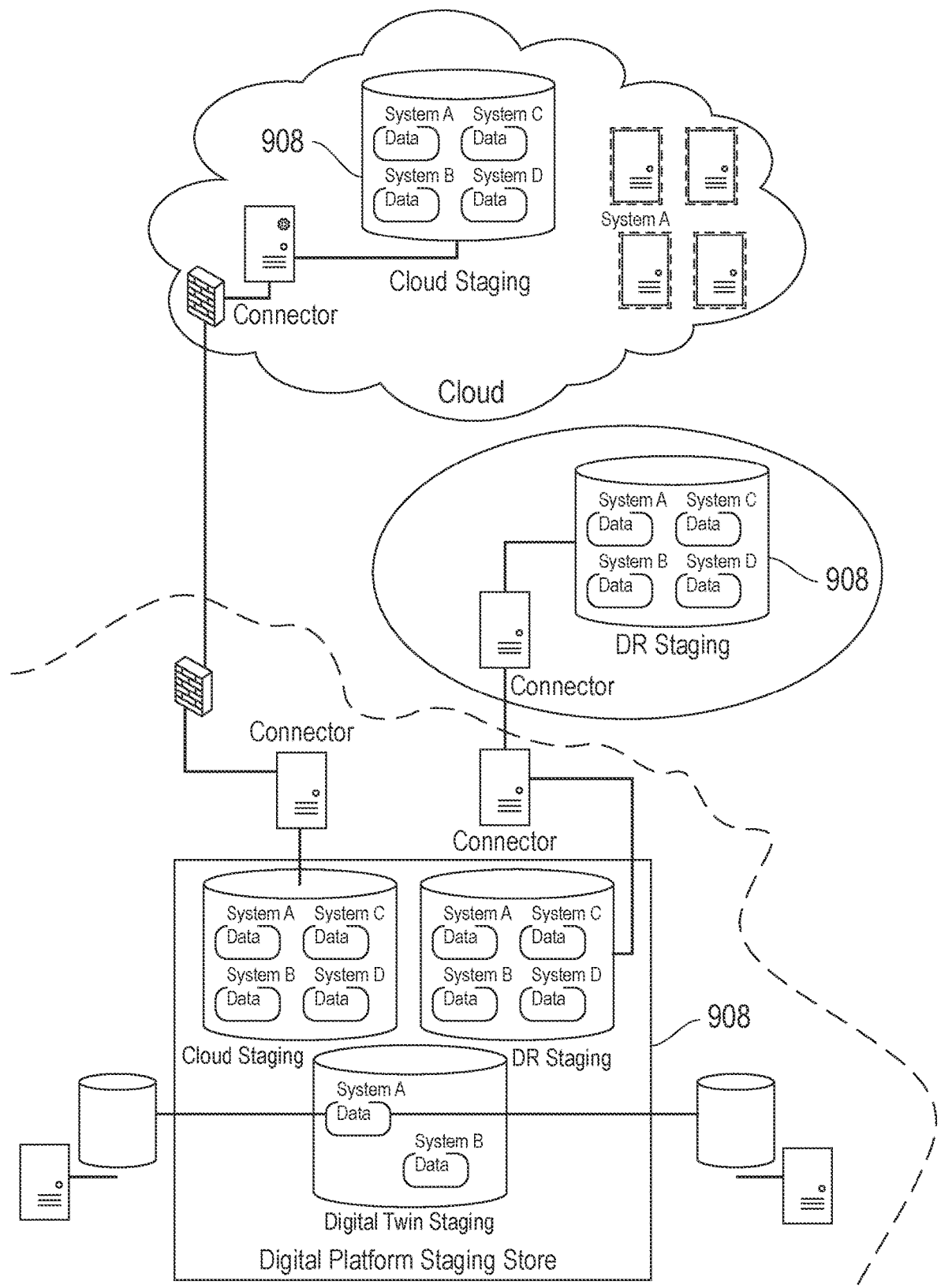
FIG. 11 illustrates realms within a digital twin staging store, in accordance with an example implementation of the present disclosure.

Within digital twin staging store 908 can be realms implemented as sub-paths, as illustrated in FIG. 11. The PaaS automation engine 902 can segregate different targets as a function of the realms. For example, in case an objective is to ship a digital twin to a DR site, clones can be staged in a specific path. A sync job can replicate the contents to a store in a different zone. If the source and target hosts are within the same network zone, the shared store can be attached to both source and target systems. Further, a local server can read from the same shared storage attached to both source and target systems. The DR syncing job can replicate data to the remote storage through a central server in the other site controlled by PaaS automation engine 902.

Figure 12:
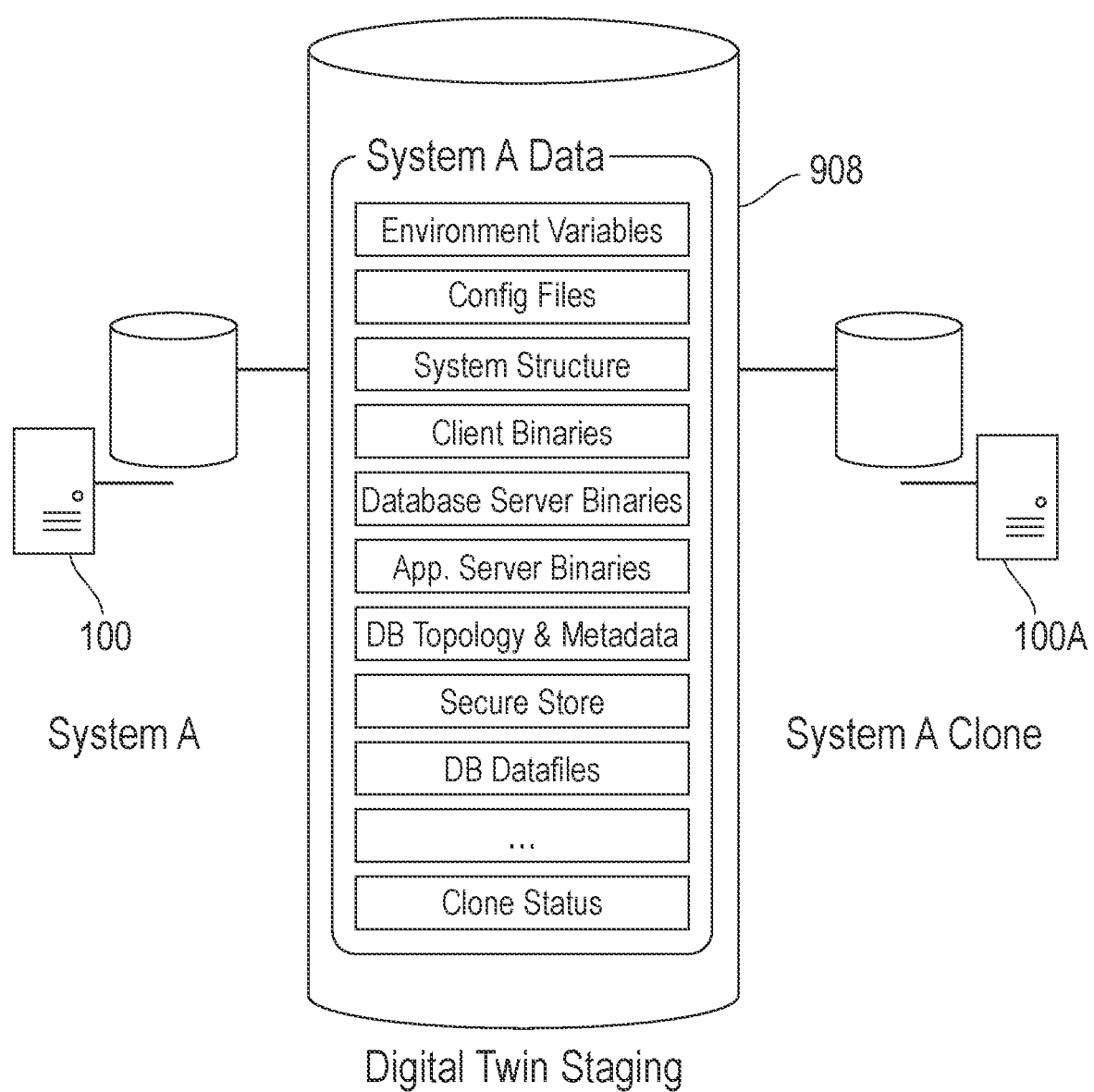
FIG. 12 illustrates an example digital twin generation implementation in which a system is cloned via digital twin staging store.

Accordingly, steps for generating digital twin parts, syncing to different zones, updating clones in the target servers based on input parameters, modifying application servers and database parameters and starting the digital twin can be effected in accordance with the present disclosure. FIG. 12 illustrates an example digital twin generation implementation in which System A is cloned via digital twin staging store 908. Clone parts of System A data can include, for example: environment variables; configuration files; source system files structure; client binaries clone; database server binaries clone; application server binaries clone; database topology and metadata; secure stores clone; database change number after the clone; database datafiles; and clone status.

Figure 13:
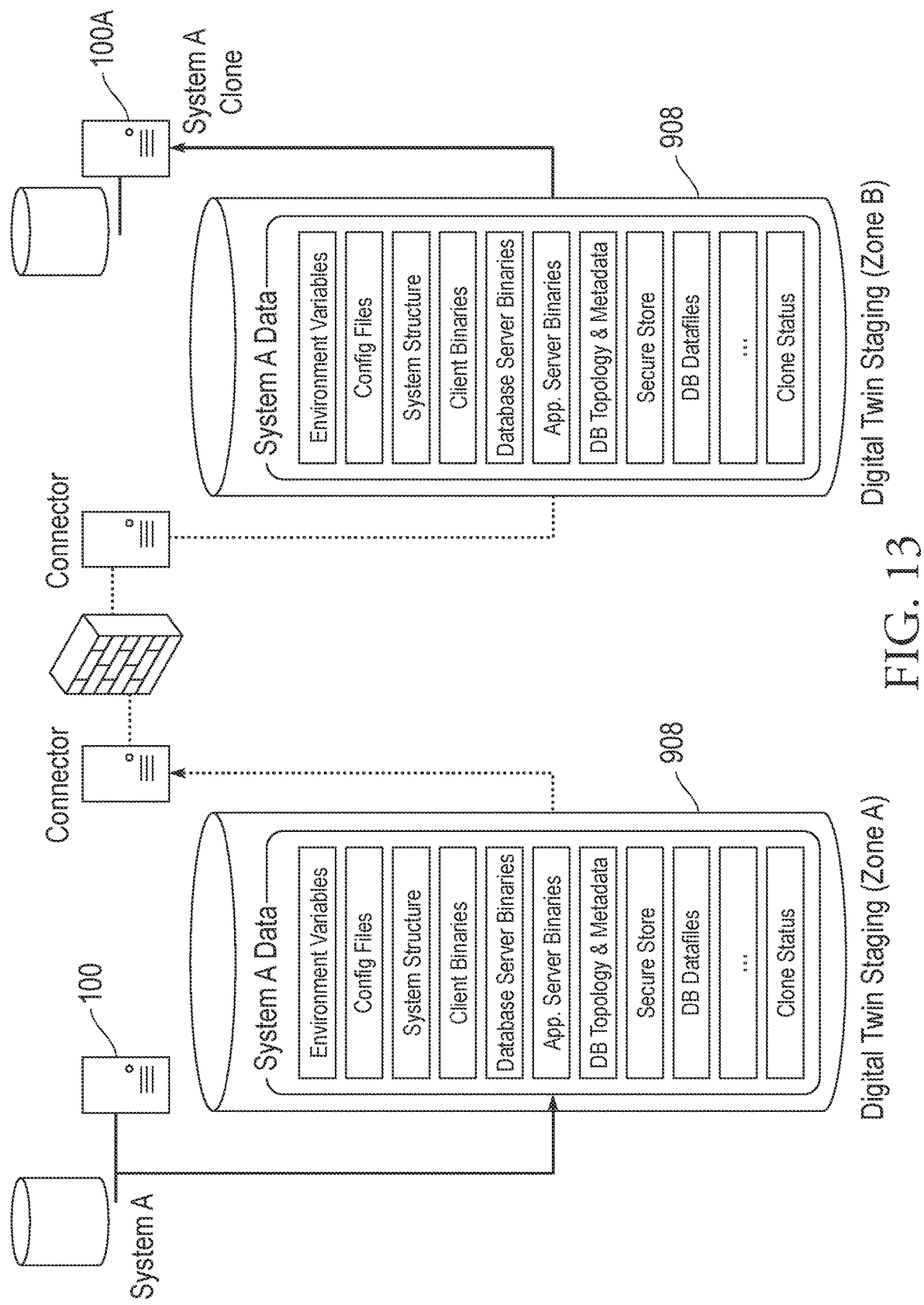
FIG. 13 illustrates an alternative digital twin generation implementation, which includes cross-zone digital twin generation.

FIG. 13 illustrates an alternative scenario associated with digital twin generation, which includes cross-zone digital twin generation. In the implementation shown in FIG. 13, PaaS automation engine 902 orchestrates the syncing process between different zones, including by communicating with connector servers. Connector servers can be used in one or more implementations to minimize exposure between different zones. For example, a connector server can be used to permit file transfers and to write to specific storage across various zones, such as in instances where a firewall or other security implementation would that restrict file transfer from any server in Zone A to any server in Zone B. Moreover, in one or more implementations, a process can be triggered by an agent interaction with PaaS automation engine 902 or as a function of an application programming interface (API)

call that is received automatically by an external program. A push operation can be received for the process, or process can be triggered by an event that the PaaS automation engine 902 realizes, for example, based on a regular job that checks for events recorded in storage media, automation engine artifacts, as a pull operation.

Figure 14:
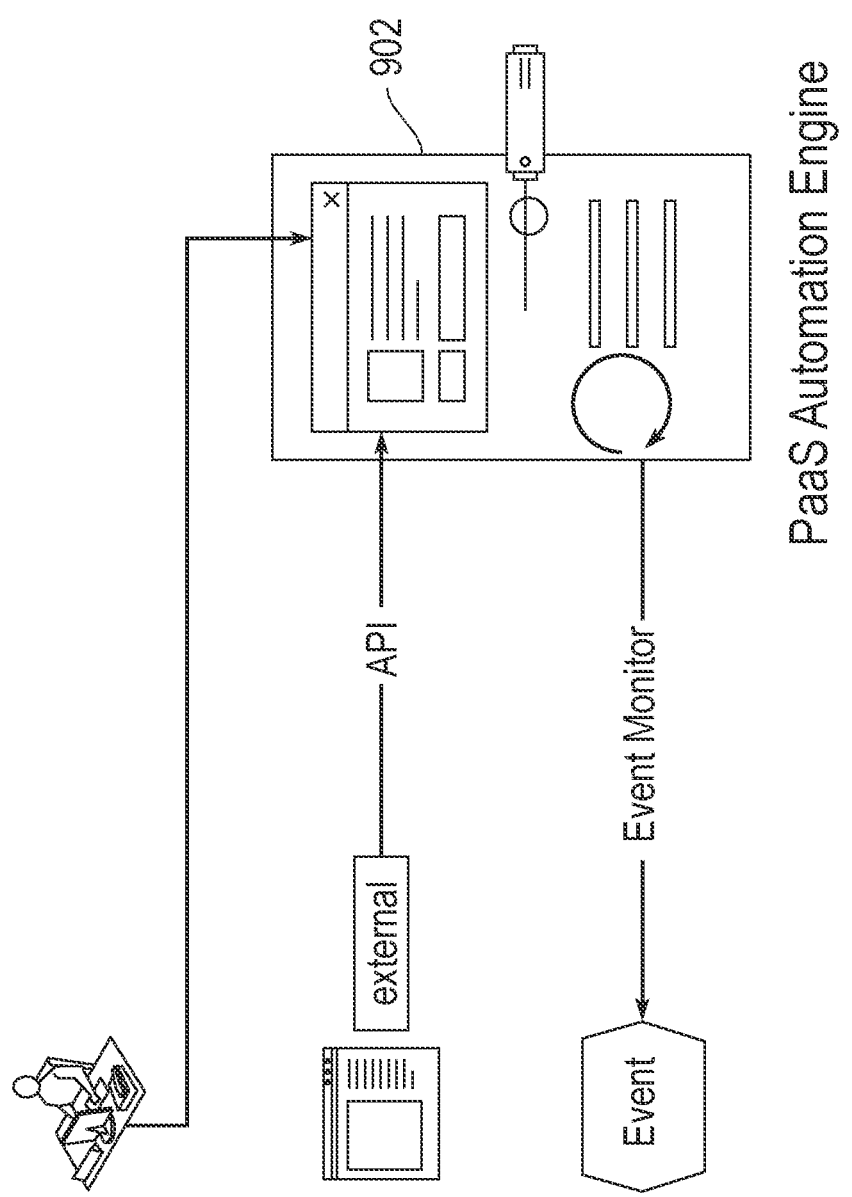
FIG. 14 illustrates example trigger options for digital twin generation, in accordance with an example implementation of the present disclosure.

With reference to FIG. 14, example trigger options for digital twin generation can be provided by an agent through web interface, such as based on API calls automatically, or triggered by an event.

Digital twin specifications can be defined by parameters and stored in digital twin templates. A template reflects a combination of source system and target digital twin. Target hosts for clones can be selected in each clone process or can be pre-defined as templates for API or event calls. Alternatively, target hosts can be reused by agent in case of rebuild requirement for the digital twin. In specific scenarios, the digital twin is hosted in specific servers and re-cloned regularly to reflect new data or setup from the source. In addition, hosts can be predefined for standby and DR systems. Parameters used for defining digital twin specifications can include: source system hosts; target digital twin system hosts; components of system to be cloned (e.g., full, application servers, and database); database type and release (in cases where the system includes a database); database name; and license files, if applicable. Moreover, secure store locations based on encrypted keys can be used for authentication. Other parameters can include clone type (e.g., a disk snapshot simulator, backup to disk, backup to central backup system) and transaction logs destination (if applicable). For common systems, the structure can be standardized and predefined with available default values. Standardization can reduce complexities associated with digital twin generation.

Figure 15:
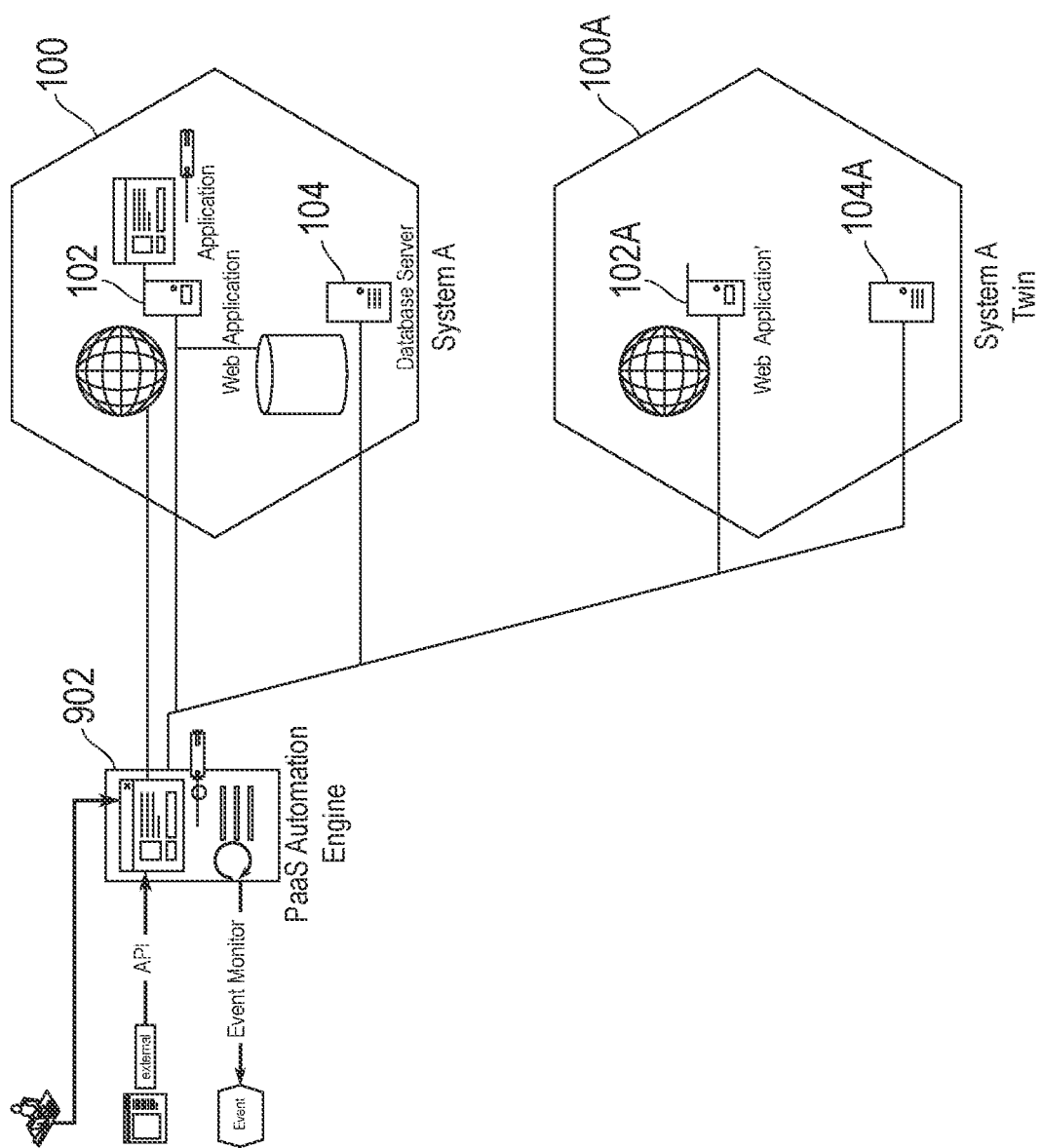
FIG. 15 illustrates PaaS digital twin generation and management, in accordance with an example implementation of the present disclosure.

In one or more implementations of the present disclosure, source system hosting servers and target system hosting servers are available and accessible by PaaS automation engine 902. FIG. 15 illustrates an example scenario of a source system that includes a database server, an application server and a web application server. Of course, the PaaS digital twin generation and management disclosed herein supports far more complex configurations than the simplified representation shown in FIG. 15.

Figure 16:
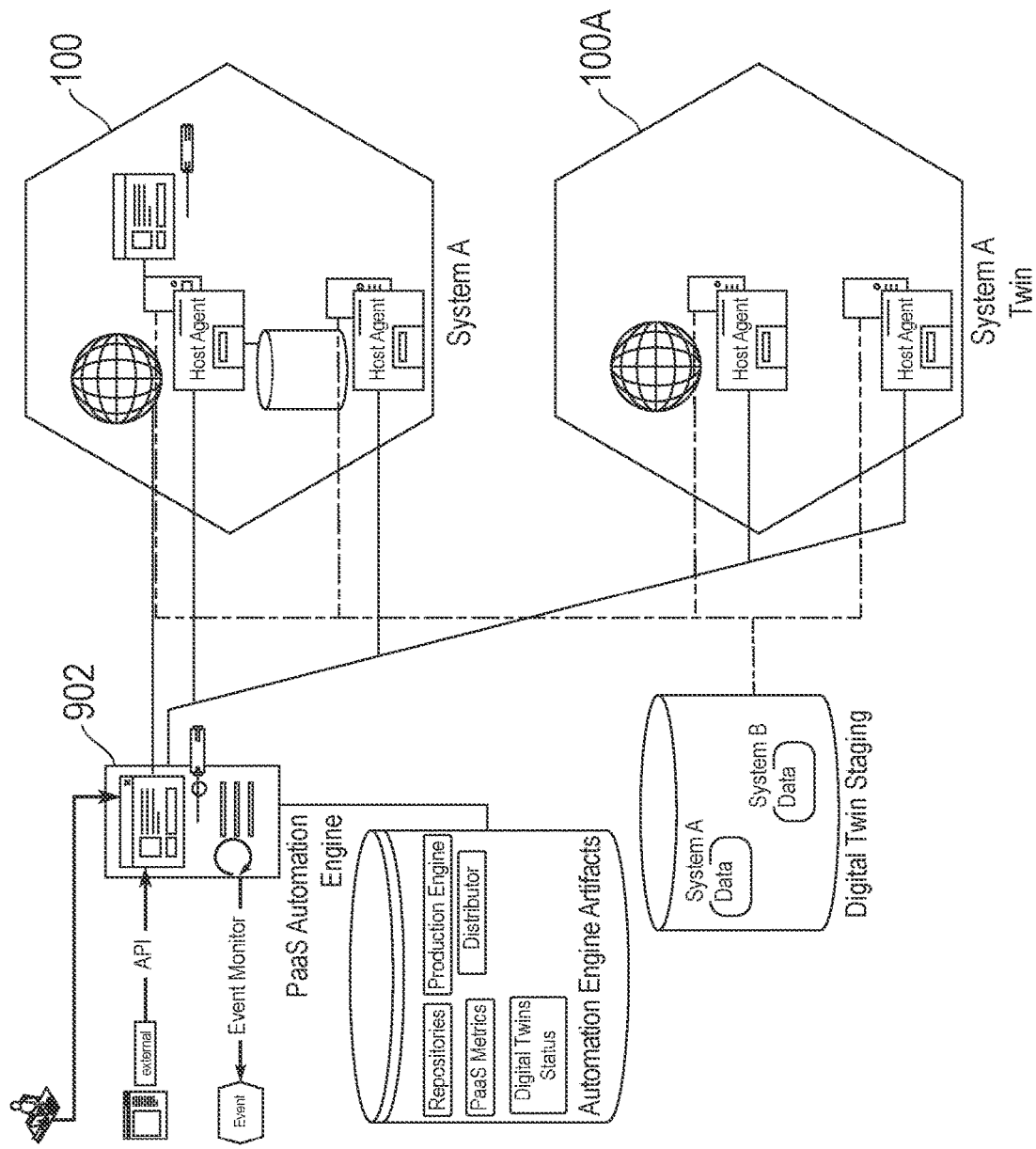
FIG. 16 illustrates an example digital twin generation and use implementation, including host agents in source and target systems.

FIG. 16 illustrates an example digital twin generation and use implementation, including host agents in source and target systems. In operation, an operation initializing digital twin generation, e.g., for a clone, is received by PaaS automation engine 902 and an operation for mounting shared storage, for example, via digital twin staging store 908 begins. The operation includes discovering parameters associated with the shared storage and passing the parameters to a server through a host agent associated with a source computing device, such as a database server. The received parameters are used to instantiate an operation to mount "component" in the local engine. The mount component operation can include interaction between PaaS automation engine 902 and the operating system of a source host, for example, as a super user (e.g., root in Linux/UNIX). For example, parameters representing a network filesystem (NFS) server, a required NFS path, mount points, and mount options can be identified and passed using the host agent via the mount operation. Further, a host agent can provide status information representing the mount back to PaaS automation engine 902, such as representing whether the mount is successful. If successful, several operations can execute in parallel in the source and target hosts. Other information provided by a host agent can represent an assessment of digital twin staging storage capacity to ensure sufficient size for cloning and run-time operations.

In at least some instances, a selected clone can be source disk backup-based and the source database supports transactions logging. In such cases, a new log archive destination can be defined and a backup operation executed. Moreover, various factors regarding databases, such as types of database systems, supported backup methods and cloning approaches, the PaaS automation engine 902 handles cloning a database platform. Further, an archive log mode can be enabled and directed to a digital platform staging filesystem through a database parameter configuration, for example, in ORACLE database platforms. Alternatively, other database platforms backup transactions' redo logs to central backup system or to local storage can be accesses and employed. In cases where logging is not enabled in the database platform of the source system, offline backup processes can be used. In one or more implementations, storage snapshot can be imitated by replicating data at the filesystem level to a digital twin staging store 908, which enables cloning across different storage types, hypervisors or clouds.

With regard to respective cloning modes, the present disclosure enabling archive log mode and directed to a digital twin staging store 908 filesystem through parameters and configuration. Other database platforms backup logs to central backup system or to local storage. Specific database platforms can generate consistent online backup of data without a need for transaction logs. For example, data snapshots can be used, which maintains consistent versions of data in memory or disk.

In operation, the clone mode parameter can be selected for relevant operations in the process. For example, values representing various operational options in specific database platforms, such as associated with ORACLE relational database management system ("RDBMS"), can be specified. Moreover, a new archive log destination can be defined for database platforms that support multiple archive log destinations, such as based on triggers. In database systems that do not support multiple archive log destinations, in which only one log backup destination can be activated, the PaaS automation engine 902 can copy logs written to server filesystems to a digital twin staging store 908, which can be executed as an operation associated with provider implementation definition ("PID") and components in a local engine of the database platform source host. The new destination is a digital twin staging store 908.

In one or more implementations of the present disclosure, a new full backup is triggered and written to a digital twin staging store 908. Alternatively, if a full backup is taken in a regular basis by the source system and written to a central backup system (e.g., NETBACKUP), full backup, to NFS storage as an example, is not necessary if the destination is within the same zone and can access the central backup system. As an optimization to the cloning process, incremental backup is triggered and written to the central backup system if the process will rely on the full backup written to central backup systems. Before triggering the incremental backup, a value representing database current system change number ("SCN") is captured during the operation. Once the incremental backup is completed, the SCN is retrieved and written to metadata in digital twin staging store. This is to get the required archive logs to have a runnable clone in the target if the backup was taken while the database is online. A SCN can be required in specific database types, such as in case of full backup written to digital twin staging store 908 if the backup was taken while the system is online. The apparatus writes the SCN following completion of the full backup. In case of a full backup written to central storage of a digital twin staging store 908 with systems that support transactions logging to multiple destinations, redo logs can be written also to the digital twin staging store 908 during the backup process.

Figure 17:
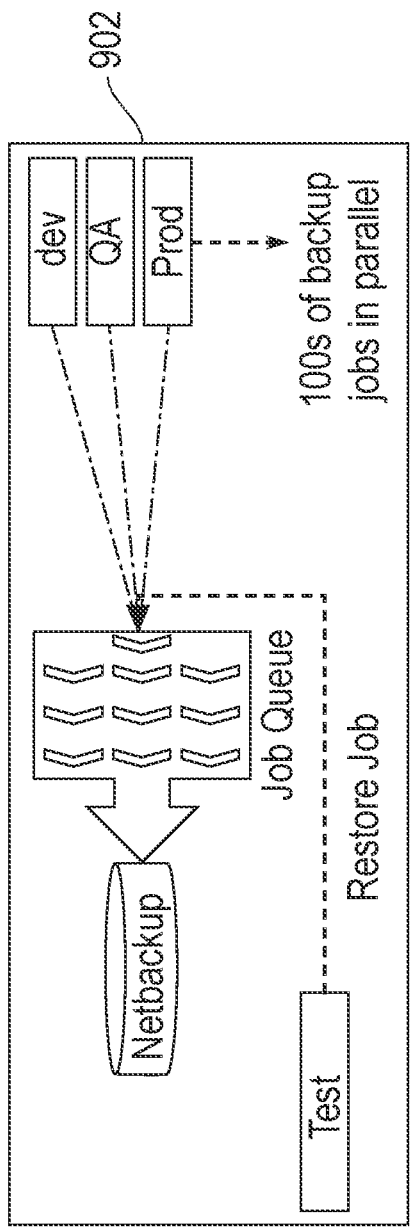
FIGS. 17 and 18 illustrate digital twin staging store backup options, in accordance with example respective implementations of the present disclosure.
Figure 18:
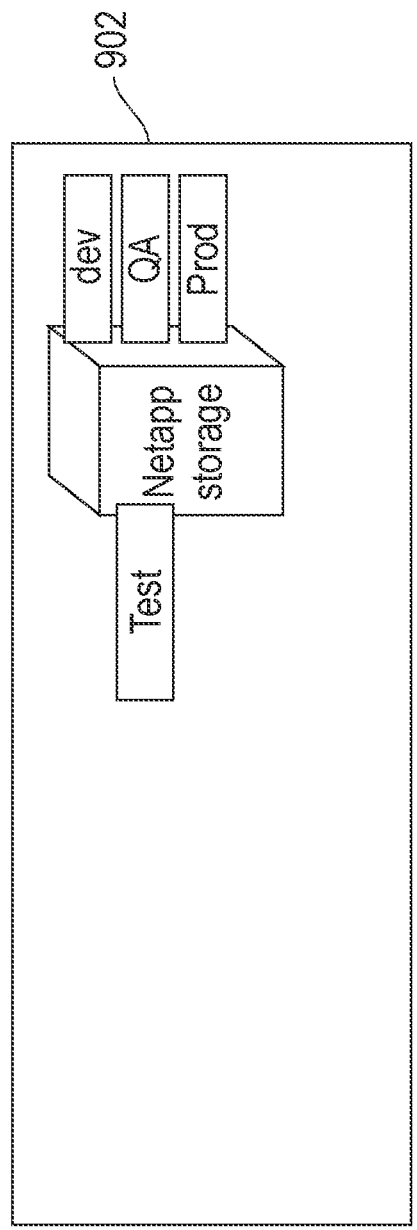

In addition, the present disclosure supports multiple backup options. FIGS. 17 and 18 illustrate digital twin staging store 908 backup options in specific scenarios. The example options in FIGS. 17 and 18 can provide improved performance, for example, compared to a central backup option. In one or more implementations, a central backup system can be used by source and target hosts to generate a clone of a system. The PaaS automation engine 902 can trigger a backup job of source files to be saved in central backup system. The PaaS automation engine 902 can further log successful completion of the backup from the source in digital twin staging store 908, which can trigger a restoration by digital twin servers, which read datafiles and redo logs from central backup. Moreover, a central backup can be supported based on availability and performance. Alternatively, a dedicated digital twin staging store 908 can be used as a convenient option, such as when central backup is used by a data center for daily backup jobs for all systems in the datacenter in order to protect data. The process could take longer using central backup system due a central backup system being used for other purposes other than for cloning and digital twin production in datacenters.

During a digital twin operation (e.g., during a cloning operation), a particular destination can be identified. In such case, in one or more implementations of the present disclosure, options for archiving to a digital twin staging store can be disabled.

The present disclosure further supports PaaS automation engine 902 triggering clone process(es) for application servers in parallel along with processes to clone one or more database platforms, such as shown and described herein. In such cases, components in the source host for the application server(s) can be analyzed, for example, for application servers, single application server, multiple application servers or combination of different application servers' types are supported. Options for selecting components from the source server can be pre-selected, for example, via a graphical user interface accessed by a client computing device, prior to initiation of the cloning process. Absent pre-selections, a selection of application servers (e.g., all servers in a list) are selected by default. Further, sizes of selected components can be measured and stored in a digital twin staging store 908 as meta data, which can be accessible by a destination application server host. As noted herein, capacity in a digital twin staging store 908 can be assessed to ensure availability of storage to accommodate the clones. For example, meta data representing data size can be provided, such as by being written to a shared meta data area controlled by PaaS automation engine 902 during active digital twin generation processes running in parallel. Once confirmed that capacity is sufficient, space is reserved and locked until the end of the process.

During operation, application servers can securely connect to database systems using connection keys stored in encrypted files included as part of the cloning process. The clone parameters can include operating system ("OS") environment representing the operating system of the user computing device running the application, OS configuration files specific to the application, file system structure for the application and directories, and application server executables and configurations. Clones can be packaged, for example, in tar format using root user to maintain ownership and permissions. Further, packaging of the source system can be performed in parallel based on component types or directories of the system structure. Following a successful clone, PaaS automation Engine 902 can unmount a digital twin staging store 908 from the source system.

Figure 19:
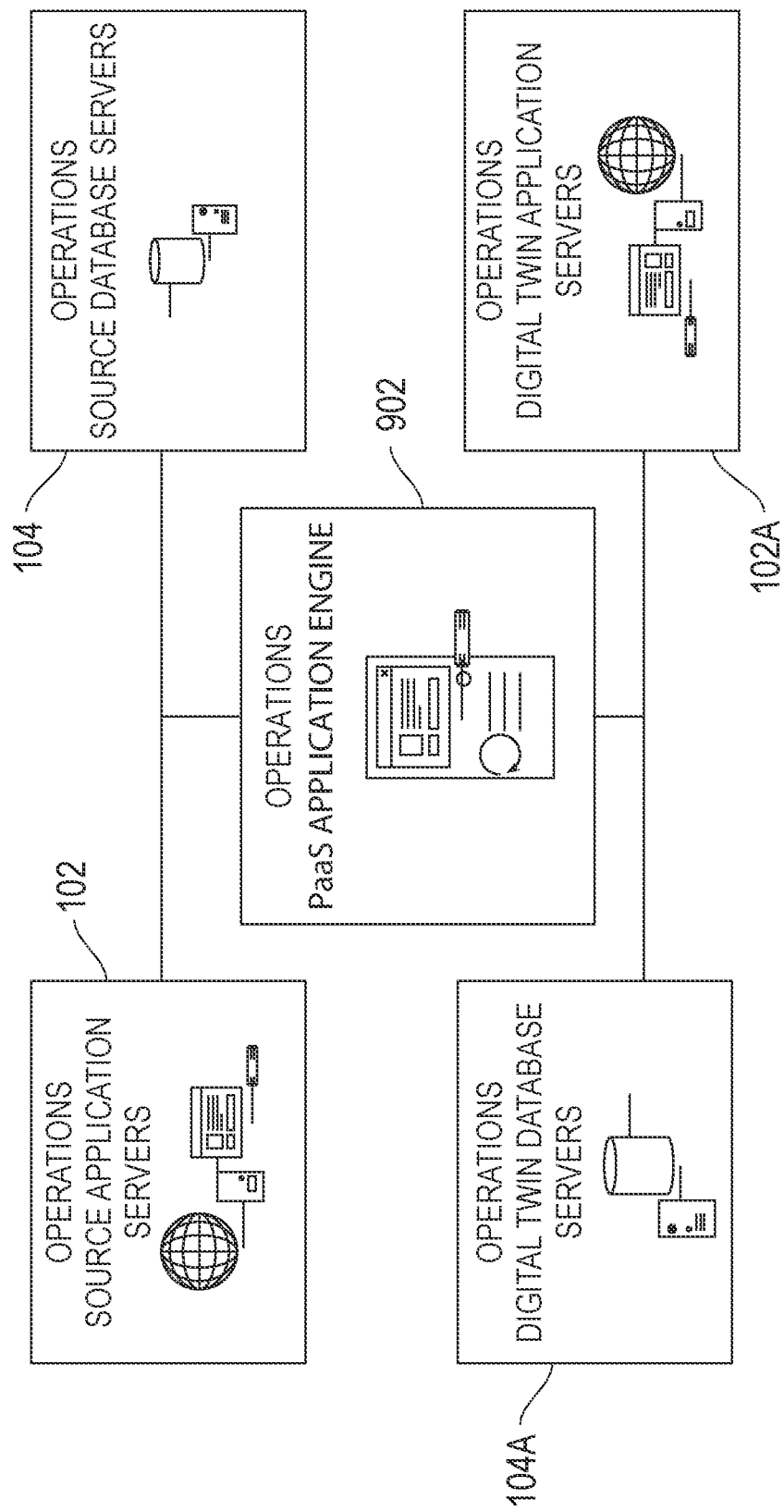
FIG. 19 is a block diagram broadly illustrating digital twin generation, in accordance with an implementation of the present disclosure.

FIG. 19 is a block diagram broadly illustrating digital twin generation in accordance with an implementation of the present disclosure. In one or more implementations, the PaaS automation engine 902 initiates digital twin production processes, including by calling four hosts in parallel communicating with PaaS automation engine host agents. PaaS automation engine 902 can operate to initiate host sub-processing in particular contexts of relevance. One or more sub-processes can access and use a predefined component to mount a digital twin staging store 908 in the relevant hosts. The component can be initiated from hosts' local engines, which can be replicated from a digital twin automation engine artifacts store 906. Further, specifications of the component can be provided by a provider implementation definition. The sub-processes can run in parallel and be interdependent, and specific steps can require inputs or completion of other steps in other sub-processes before executing. In one or more implementations, each component in the source system and digital twin system are handled effectively by the PaaS automation engine 902, which begins by analyzing the types of application servers. Each type can execute a respective sub-routine to handle, for example, each server's corresponding structure, connection keys, OS environment, executable, system component configurations, backups, database ("DB") clients, DB executable, DB configurations, DB Network and DB OS configurations. Examples of application servers include TOMCAT, JAVA APPLICATION SERVER, and ABAP Application servers. Examples of database platforms include ORACLE, HANA, and POSTGRESQL.

Target hosts assigned for digital twin production can be generated via verifying steps to prevent conflicts of an existing or running component with a digital twin. In particular implementations, an existing twin can be terminated and its resources reclaimed for new digital twin generation. Digital twins can become obsolete over time, requiring regeneration to include and provide most recent versions of source software and data, thereby improving reliability of various data, configuration, and other experimentations that execute or operate in the digital twins.

Figure 20:
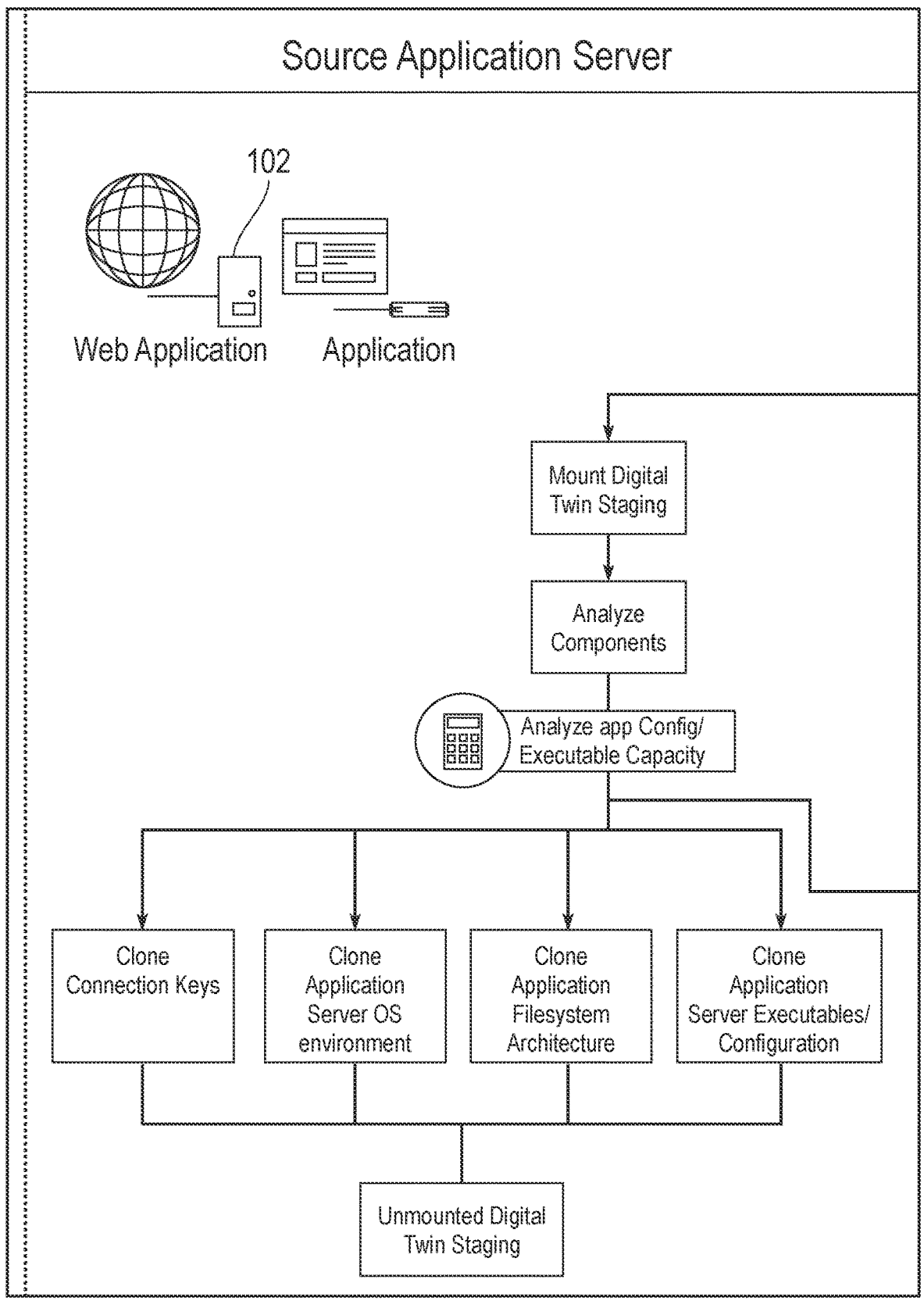
FIG. 20 represents a source application server sub-process, including to package and replicate components from a source host to a digital twin staging store.

Referring to FIG. 20, a source application server sub-process executes, including to package and replicate components from the source host to a digital twin staging store in parallel, after confirming the availability of space in the digital twin staging store. Resources can be shared with one or more other subprocesses, such as storing metadata in digital twin staging store 908, including to lock required space and verify availability of resources in the target hosts for digital twins. Once successful, the digital twin staging store 908 can be released from source application server hosts. Continuing with the example shown in FIG. 20, PaaS automation engine 902 executes processes to mount a digital twin staging store 908 and components analyzed. Application configuration and executable capacity is analyzed, and operations to clone connection keys, clone application server OS environment, clone application filesystem architecture, and clone application server executables/configuration are executed prior to the PaaS automation engine 902 unmounting the digital twin staging store 908.

Figure 21:
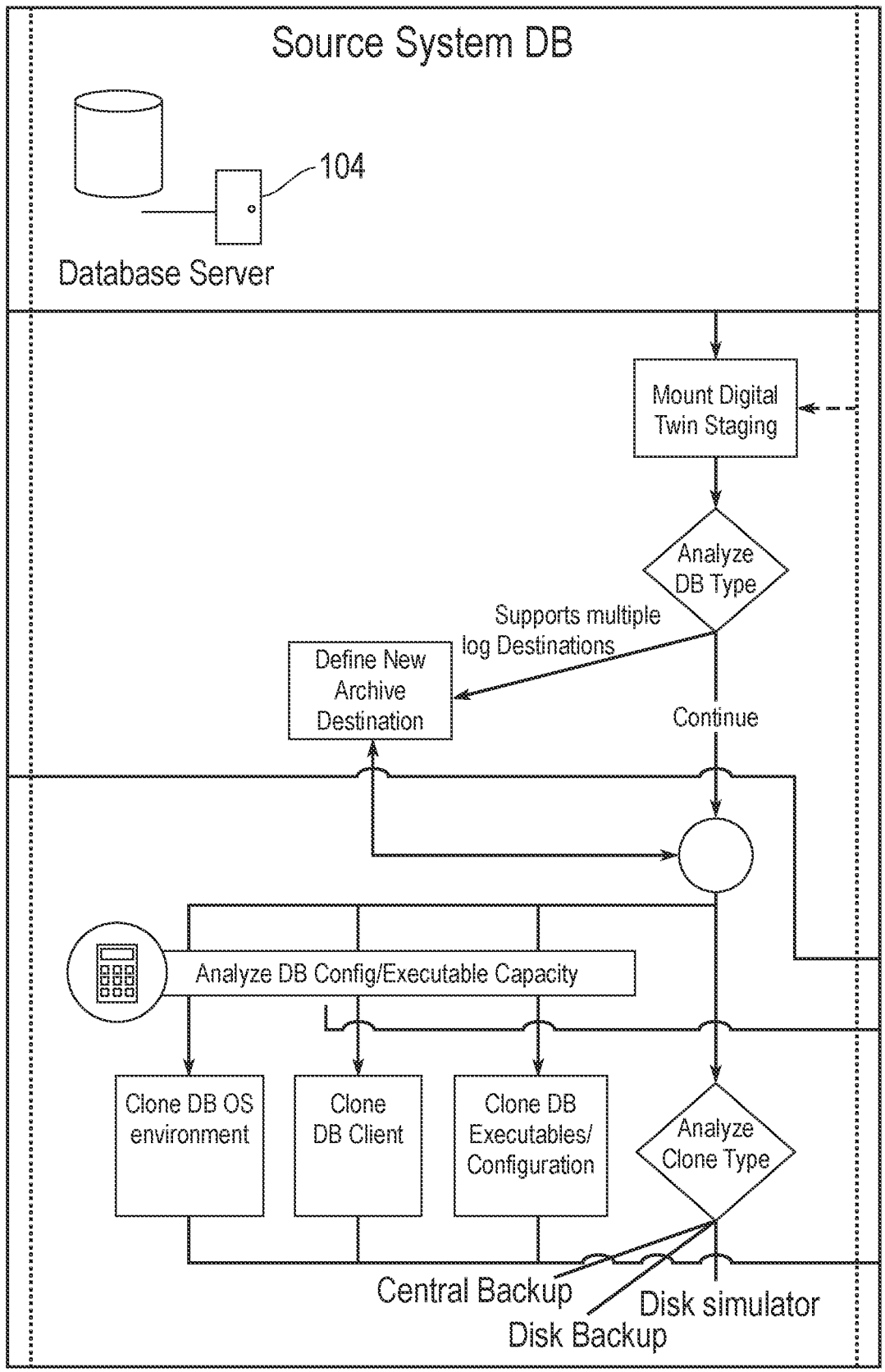
FIGS. 21 and 22 illustrate execution of an example source system database defining a new archive destination based on a database type, selected parameters, in accordance with an implementation of the present disclosure.
Figure 22:
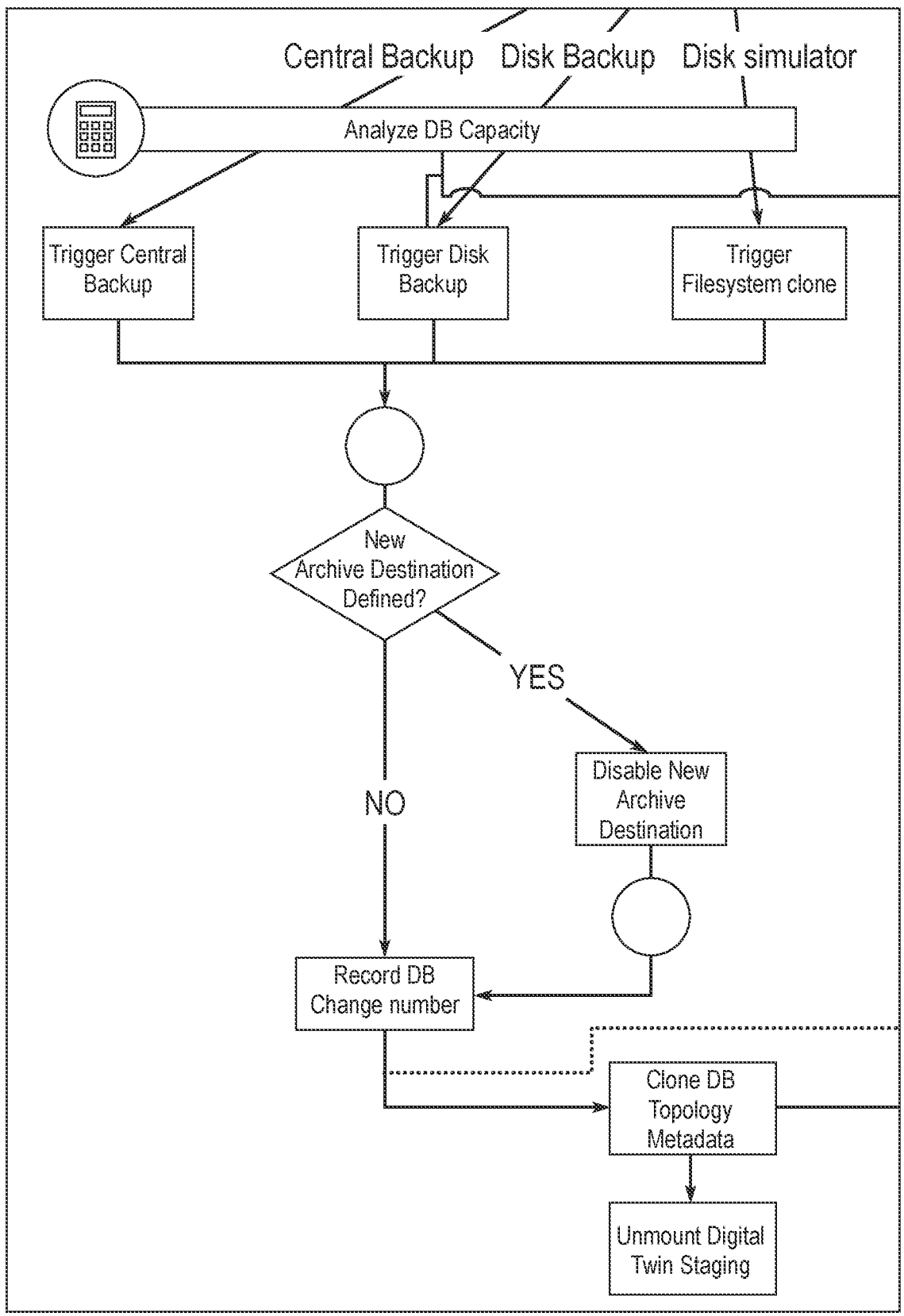

Referring now to FIGS. 21 and 22, a source system database sub-process executes, including to define a new archive destination based on a database type, selected parameters, or default parameters, for example, to write redo logs to a digital twin staging store 908. Database platforms can include executables, configuration files, data files, and metadata associated with the database topology. To generate a digital twin in a new destination, components of database platforms can be packaged, including by initiating packaging of OS environment, database client, database executables and database configuration. File authorizations and ownership can be maintained, for example, via a power OS user utilized for packaging, such as using root in LINUX to execute "TAR" commands. In one or more implementations, such operations can be defined as components in a digital twin automation engine artifact store 906 and protected in the apparatus through checksum.

Continuing with the example shown in FIG. 21, a PaaS automation engine 902 initiates operations to mount a digital twin staging store 908 and a determination is made by analyzing whether the respective type of source database supports multiple log destinations. If so, then the process branches to define a new archive destination. Database configuration and executable capacity is analyzed, and operations to clone DB OS environment, to clone DB client, and clone DB executables/configuration execute.

With reference to the example implementation shown in FIG. 22, based on the clone type selected as part of the trigger from PaaS automation engine 902, the capacity of the database can be analyzed in parallel, based on a component defined in a digital twin automation engine artifacts store 906 and replicated in the local engine. The capacity can be shared with other sub-processes in the digital twin staging store. Based on the selected type and capacity assessment, central backup, disk-based backup or filesystem-based backup is triggered. Central backup can be incremental or full. In instances where regular full backup is taken for the source system, an incremental backup can be used to reduce time.

Continuing with reference to FIG. 22, upon successful data replication to the digital twin staging store or central backup disks, a determination is made whether a new archive destination is defined. If so, the new archive destination can be disabled. If no new archive destination was previously defined, or following disabling the new archive destination if one was previously defined, the process continues to record a database change number is recorded in digital twin staging store metadata to ensure a consistent database in the target twin for point-in-time replication. In accordance with the process shown in FIG. 22, information representing topology, database structure and change numbers is recorded in a specific database file, for example, a control file (ORACLE DB). Furthermore, the file can be replicated to the digital twin staging store 908 following completion of the backup to acquire metadata related to the backup and changes in the topology file. By completing this step, the sub-process finalizes by unmounting the digital twin staging store 908 from system DB host.

Figure 23:
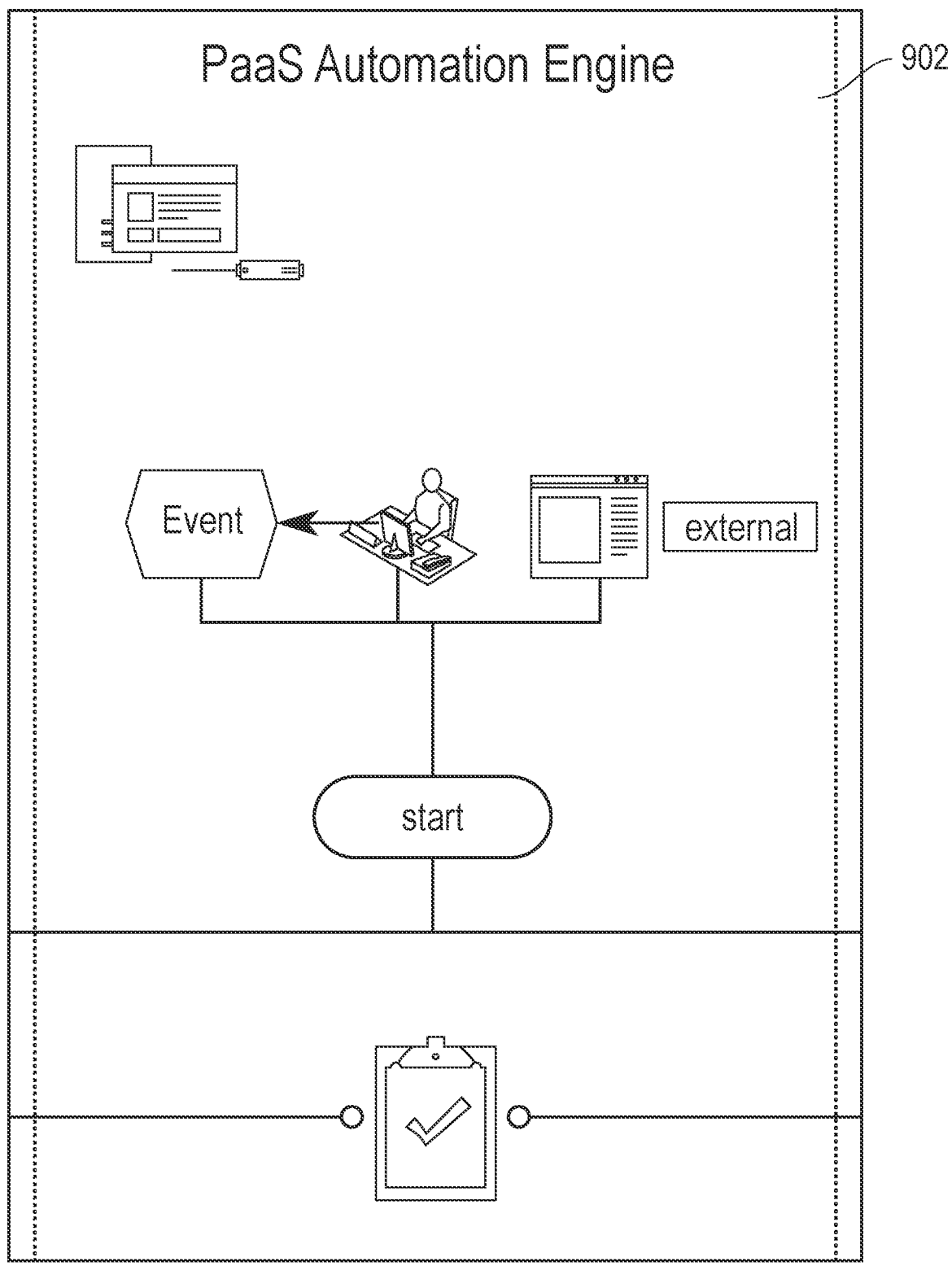
FIG. 23 illustrates processes associated with source and target hosts as orchestrated by a PaaS automation engine, in accordance with an implementation of the present disclosure.

Referring now to FIG. 23, sub-processes and sub-steps in source and target hosts are orchestrated by PaaS automation engine 902. Dependencies between sub-processes can further be controlled by PaaS automation engine 902, and PaaS automation engine 902 also reads events in a PaaS events store. Digital twin status store can be updated by PaaS automation engine 902, and digital twin templates can be saved by PaaS automation engine 902 for future reuse or tuning. PaaS automation engine 902 replicates engine components and PIDs to the relevant hosts ahead of the sub-processes executing in each relevant host. PaaS automation engine 902 stores systems components topologies and dependencies. Upon successful twin generation, the topologies can be applied to the twin system. This enables the generation of twins from the new twin system.

PaaS automation engine 902 can initiate processes in a digital twin system that include preparing and verifying server readiness. Once prepared and verified, operations can execute in a sleep and check mode. Rather than performing processes sequentially, such as by completing all activities in the source system that may include multiple components (e.g., relating database(s) and web application server(s)), source and target host activities can be triggered in parallel. In certain instances, a database backup process can take longer than preparing the executables of the web application servers. For example, application server binaries can be written to digital twin staging store 908, and PaaS automation engine 902 can begin cloning an application server in the digital twin server. Similar operations can occur for a given database that includes multiple sub-components, such as data, redo logs, control file(s) and binaries. Both source and destination hosts can have mounted digital twin staging stores, with reference to an area within a respective digital twin staging store 908 for a specific digital twin generation process.

In one or more implementations, a graphical user interface can be provided that includes a wizard for providing a digital twin staging area for a digital twin generation process. For example, a digital twin server can be configured to wait for a backup process of a source database to complete. Once, complete, the digital twin server can be notified about the readiness of the recovery process by having a flag file called, which can be generated by the source server. Accordingly, a sleep and check mode associated with the readiness of database recovery in a digital twin server can be implemented.

For example, PaaS automation engine 902 can execute one or more processes to check the completion a status file and, if complete, can initiate cloning in one or more destination hosts. As shown and described herein, digital twin staging store 908 can contain data files, logs, configuration files, system binaries, and metadata, among others, in one or more implementations of the present disclosure.

Furthermore, sub-processes can be directed to execute in destination hosts to prepare application server and database binaries. For example, links are generated in a file system to reflect a source architecture. Moreover, size requirements can be calculated based on source metadata. If not enough space is available, one or more API calls to hypervisor to extend storage of virtual machines can be made. Once successful, binary and configuration files replication can be orchestrated by PaaS automation engine 902.

In specific database and application server types, configuration files are associated with hosts utilized by a source system. Configuration files can be updated to replace a source host name with target destination names, followed by starting a database platform in cases where cloning is based on backup and restore. As noted herein, a database backup can be written to a digital twin staging store 908 or central backup. In case of a central backup, a connection to central backup system is attempted from the destination host by using the source utility file to call (e.g., netbackup). The source utility file is availed in digital twin server as part configuration files cloning from source server to destination server using Digital Twin Staging Store. The steps of cloning binaries and configuration files can occur prior to triggering a database restore process. After successful cloning of the binaries, configurations and control files, restore from central backup can be achieved.

Alternatively, in case a backup to digital twin was written to digital twin staging store 908, then the backup files can be cataloged in a destination control file. This can be followed by a restore activity from digital twin staging store 908.

Once a database system is started, a restore process can be initiated. In cases where cloning is based on filesystem backup, cloned data files can be replicated in a destination prior to starting the database system. Upon restoration of a backup, PaaS automation engine 902 can initiate a recovery process for online backup. For example, a system change number (SCN) can be communicated from a source to target using a digital twin staging store status file, such as using ORACLE. Thereafter, one or more attempts to open a database and read data are made, following completion of a recovery. One approach of verifying a successful recovery and readiness to open a database can be by checking a distinct change number associated with data files. A status of database can be verified and returned to an automation system of the PaaS automation engine 902 for generation and storage of digital twin staging store metadata.

In one or more implementations of the present disclosure, a name of a database instance is modified to distinguish the instance from the source or twin(s) database system. Modifying the name can depend, for example, on a respective database type and be associated with configuration files for a database and corresponding network, a database control file which stores database topology information, a filesystem structure, or data files. For example, conversion of an ORACLE database system name can be automated via PaaS automation engine 902, for example, to update Sqlnet.ora, listener, and parameter files, based on the respective target name. Moreover, a control file of a database can be updated by exporting content, scanning the content, updating the content, and generate a new control file, based on the trace. An operation can be triggered by PaaS automation engine 902, which communicates with a digital twin host, for example, using a host agent. Based on a respective definition of an operation, an automation artifact component for rename can be triggered. A trace version of the control file can be generated automatically as part of this operation. Once generated, the PaaS automation engine 902 can edit the trace file to replace the name of the source with the name of the destination, in accordance with one or more parameters defined earlier. Additional database aspects, such as temporary files, can be modified as part of control file generation based on the new database name. This can be achieved using sed commands in the LINUX operating system.

Figure 24:
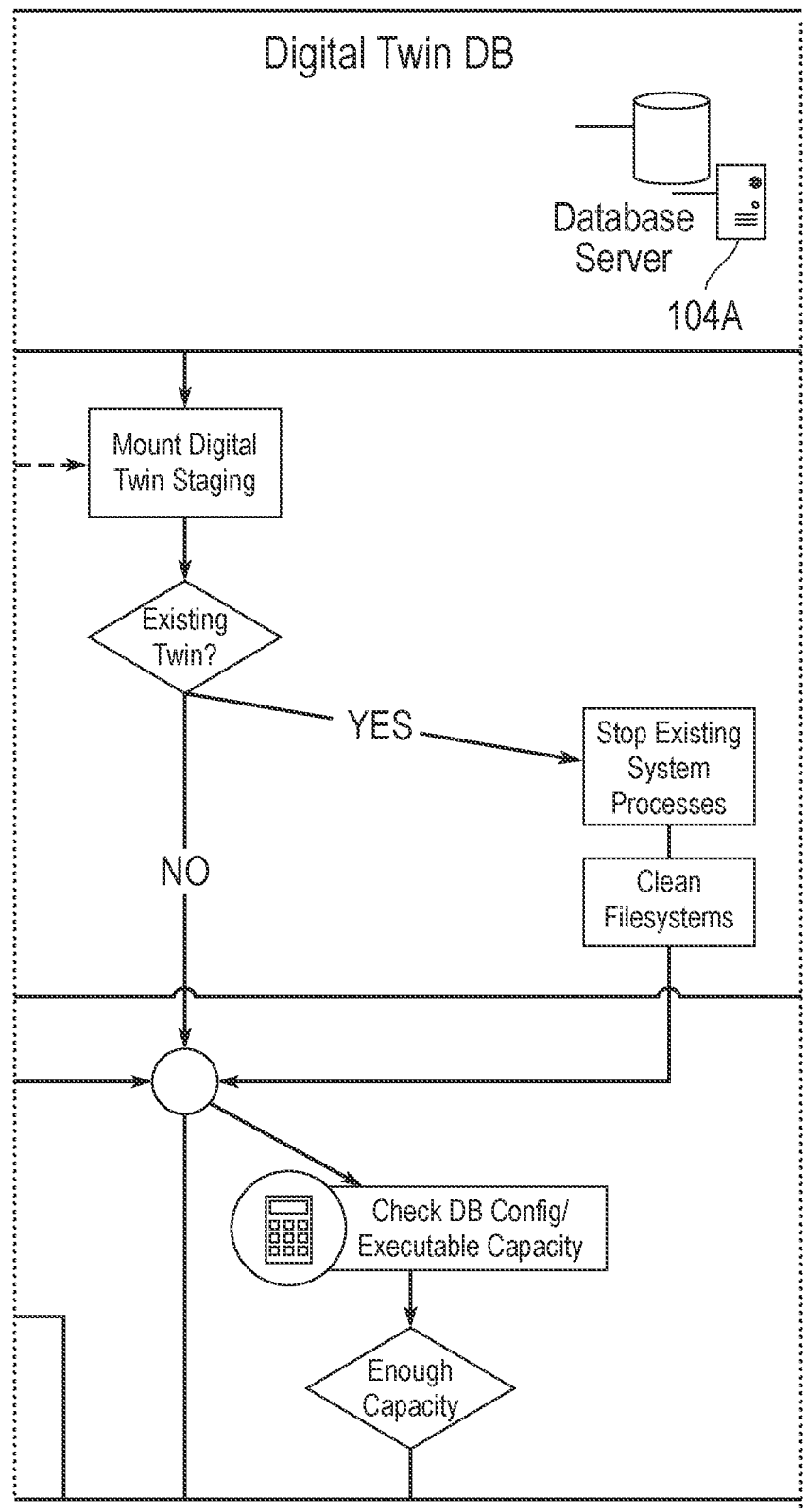
FIGS. 24 and 25 illustrate an example digital twin generation process can be initiated by PaaS automation Engine, in accordance with an implementation of the present disclosure.
Figure 25:
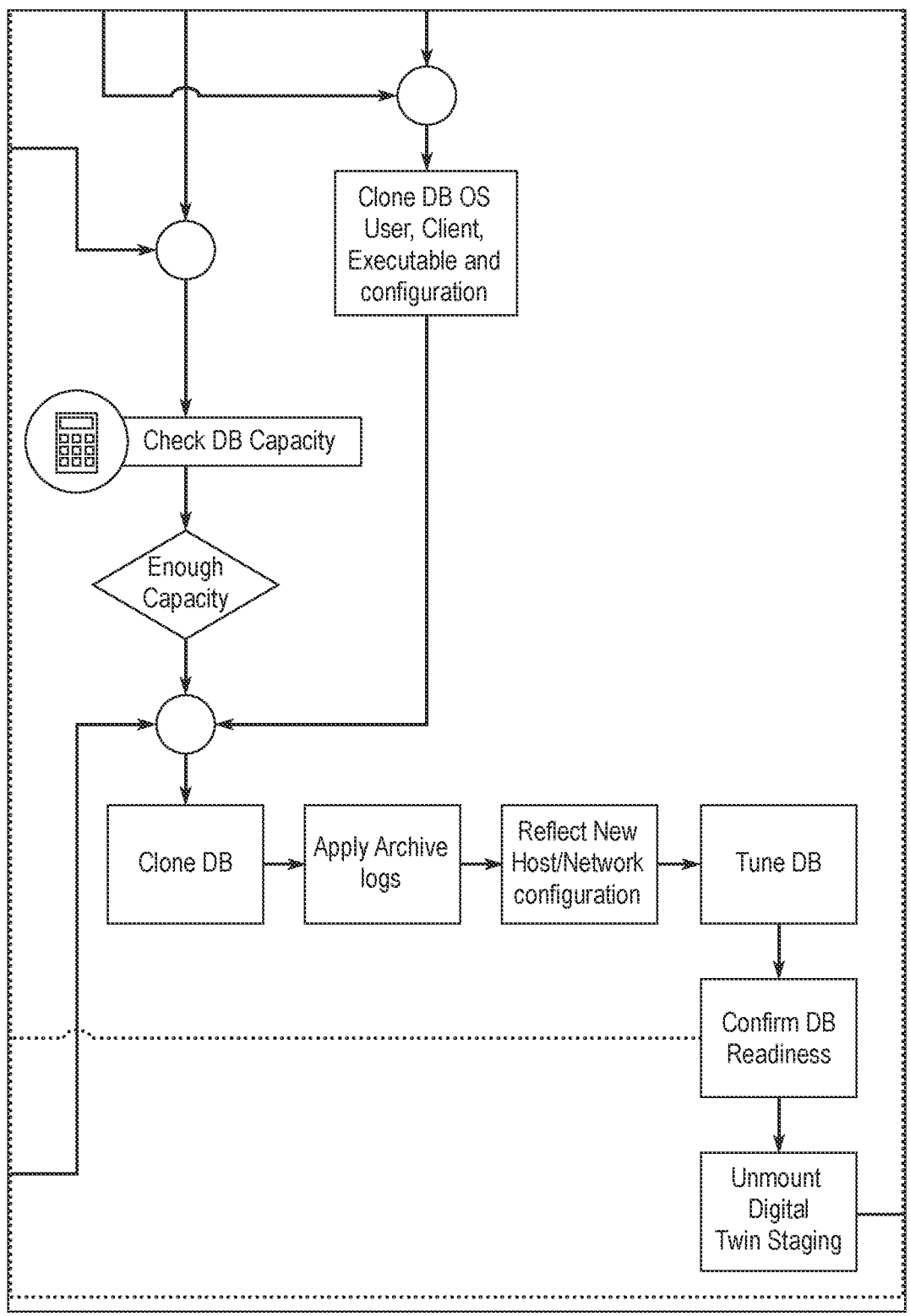

Referring now to FIGS. 24 and 25, a digital twin generation process can be initiated by PaaS automation Engine 902 to execute digital twin database operations in a twin host. For example, and as shown in FIG. 24, digital twin staging store 908 is mounted and a determination is made a potentially conflicting digital twin or digital twin process that exists in the target host. In such case, the process is stopped and existing filesystems are cleared. This can also occur in case an existing host has a running digital twin having the same target name. In such case, the target should be rebuilt based on new specifications or updated in the source. The process then proceeds to request and/or receive input from a source database cloning process. For example, input may be used to obtain storage and processing capacity of a target host. In addition, one or more processes can execute to share such information, for example, in a source database host following a check and confirmation of sufficient capacity in digital twin database host. In response, actions can be taken such as to extend the filesystem by allocating additional logical unit numbers (LUNs) or pause an actor action, thereby extending capacity. Various paused operations can resume when sufficient resources are available.

Continuing with reference to FIGS. 24 and 25, with available storage, the process waits until the clone of database platform is complete and is available from the source to the digital twin staging store 908. Thereafter, a database management system build is initiated, including to extract binaries, clients, OS configuration and environments for the clone. The process continues by generating datafiles and database topologies. After a confirmation process ensures completeness and accuracy of the digital twin, the twin database platform is started, without data, followed by initiating a restore process. In implementations of the present disclosure involving use of a database storage snapshot for database, datafiles and directory structures can be restored in advance the database platform start.

Following restoration, data transaction logs can be reference for replay up to the point of a specified change number, such as captured in the source system database (FIG. 25). New host and network configurations can be updated using information stored in database configuration files, such as to change a source host name to target host name in the digital twin database host. In certain cases, a target host has fewer resources than that of a source host. Accordingly, operations can adjust database parameters automatically, for example, via a PaaS automation engine 902 initiated operation. An example for such parameters can include memory related parameters, such as System Global Area. If the operation is successful, database consistency can be verified and the database platform started.

In addition to database servers, PaaS automation engine 902 handles application servers as part of digital twin generation, including by interacting with a database tier and an application server tier. In application servers (e.g., ABAP or TOMCAT), configurations can be specified in parameter files. One or more parameter files can store and represent, for example, connection data to a database instance, encrypted connection key(s), configuration files, and information representing a database server name or internet protocol (IP) address.

Figure 26:
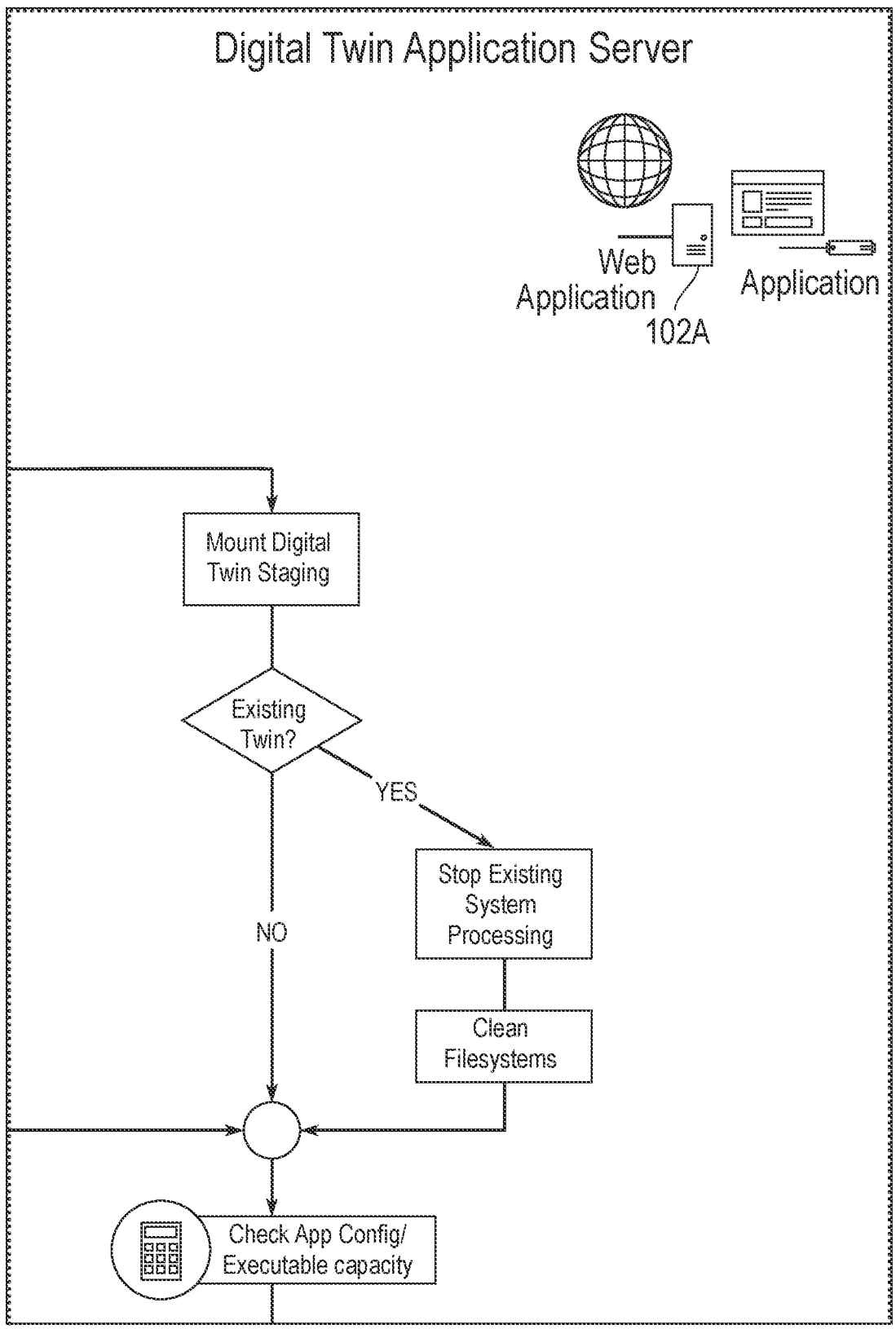
FIGS. 26 and 27 illustrate an example process, including steps associated with a check for a previous generation process running on an existing application server of the digital twin, in accordance with an implementation of the present disclosure.
Figure 27:
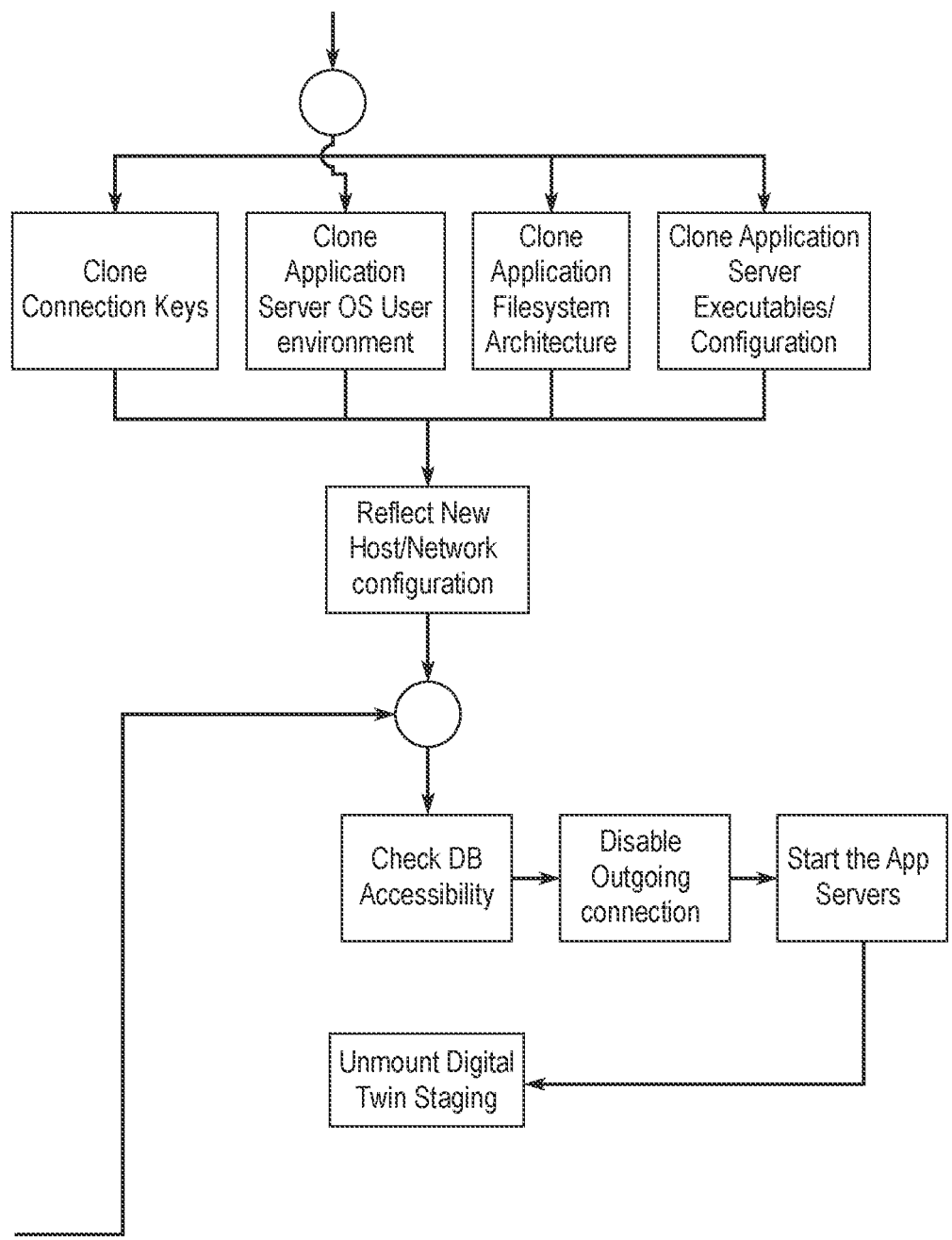
Figure 28:
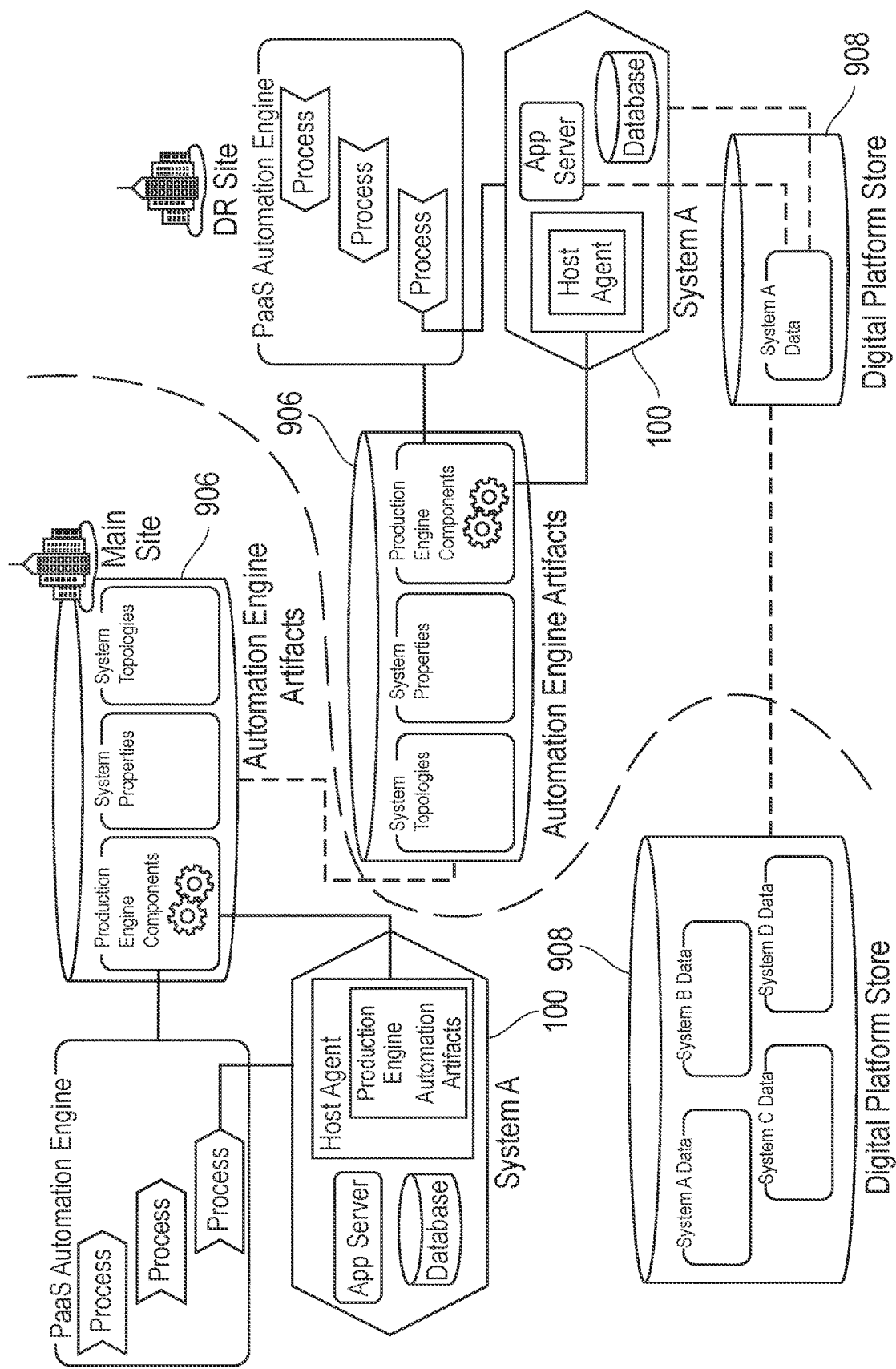
FIGS. 28-31 illustrate implementations of the present disclosure with regard to PaaS-based digital twin generation and use in disaster recovery and cloud zones, in accordance with an implementation of the present disclosure.

With reference to FIGS. 26 and 27, a check for a previous generation process running on an existing application server of the digital twin is made. In specific scenarios, running processes are terminated and existing data are deleted to prepare for a new twin generation. Capacity is verified based on an input from source application server cloning sub-process, communicated using the digital twin staging store and orchestration by the PaaS automation engine 902. If enough capacity is available, connection key files, OS environment, filesystem architecture, execution and configurations of source application server are cloned in the target server. Host names of the digital twin system, including DB host name, can be reflected in the digital twin configuration files. In particular implementations, network isolation is required to preclude a digital twin system from connecting to a source production target. In such instances, specific IP addresses are isolated, such as via an IP table in LINUX. The IP addresses can be operated on as input parameters or can be identified and analyzed by the source application host server. Network isolation can also be achieved by updating connection configurations in one or more respective digital twin servers, in which information representing the configurations can be stored in the database or configuration files in the filesystem. For example, RFC connection configurations can be stored in database table for an ABAP application server. A mapping process can be performed between source and target systems, in which IP addresses of the source systems are replaced with IP addresses in the target digital twin environment.

If a respective digital twin system includes a database platform, connecting to the database platform can be established using database connection keys, which can be a single attribute or a group of attributes, where the combination may act as a key, or by using trusted connections. If successful, PaaS automation engine 902 can attempt to start application servers in a digital twin server. The subprocess concludes by PaaS automation engine 902 updating metadata of the cloning process in the digital twin staging store, unmounting digital twin staging store 908, and reflecting the successful status of twin generation.

In many cases, mapping between a source system and target system can be used for generating a semi-identical twin, in which source and target twin distribution of components and the number of scaled-out components may be different. In some cases, changes in the source system's topology can be made, such as in view of resource limitations or other variables. Information representing a source topology can be stored in metadata and used identify components and relationships, such as XML data with dependency details. Optional components can be marked. Further, a predefined structure of the source can be stored in a digital twin automation engine artifacts store 906. Accordingly, in one or more implementations of the present disclosure, semi-identical twins can be realized by allowing changes in the topology. For example, a twin application server and database server can be located on a single host, while the source system allocates one host per component. Moreover, optional components can be omitted or eliminated in a semi-identical twin production, such as depicted in FIG. 7.

Referring now to FIGS. 28-31, implementations of the present disclosure are described with regard to DR and cloud zones. In particular use cases can include cloning a system to a DR site, standby or to another cloud zone. In such cases, default destinations of a full backup and archive logs can be to a digital twin staging store 908. Contents can be replicated to storage in a target site, for example, by using file sync processes that track and send delta changes to other sites, such as using the rsync command in UNIX. In specific cases, a DR site or a cloud site is isolated or protected via one or more firewalls, and syncing processes occur directly from the source to target servers. In such cases, central shipping servers can be utilized.

In one or more implementations, a digital platform staging store (DPSS), as opposed to a digital twin staging store, can be included and mounted in connector servers. In such implementations, each zone can have one or more respective connector servers, in which jobs send data to a target destination which is monitored by PaaS automation engine 902. Further, communication between source and target sub-processes can be effected via metadata files, for example, that are shipped from one server or site to another and used for controlling the process. PaaS automation engine 902 can be configured outside of a respective zone and execute instructions to control inter-zone sub-processes. Alternatively, and as shown in the example implementation in FIG. 28, a respective PaaS automation engine 902 can be configured per zone, and control intra-zone sub-processes.

Figure 29:
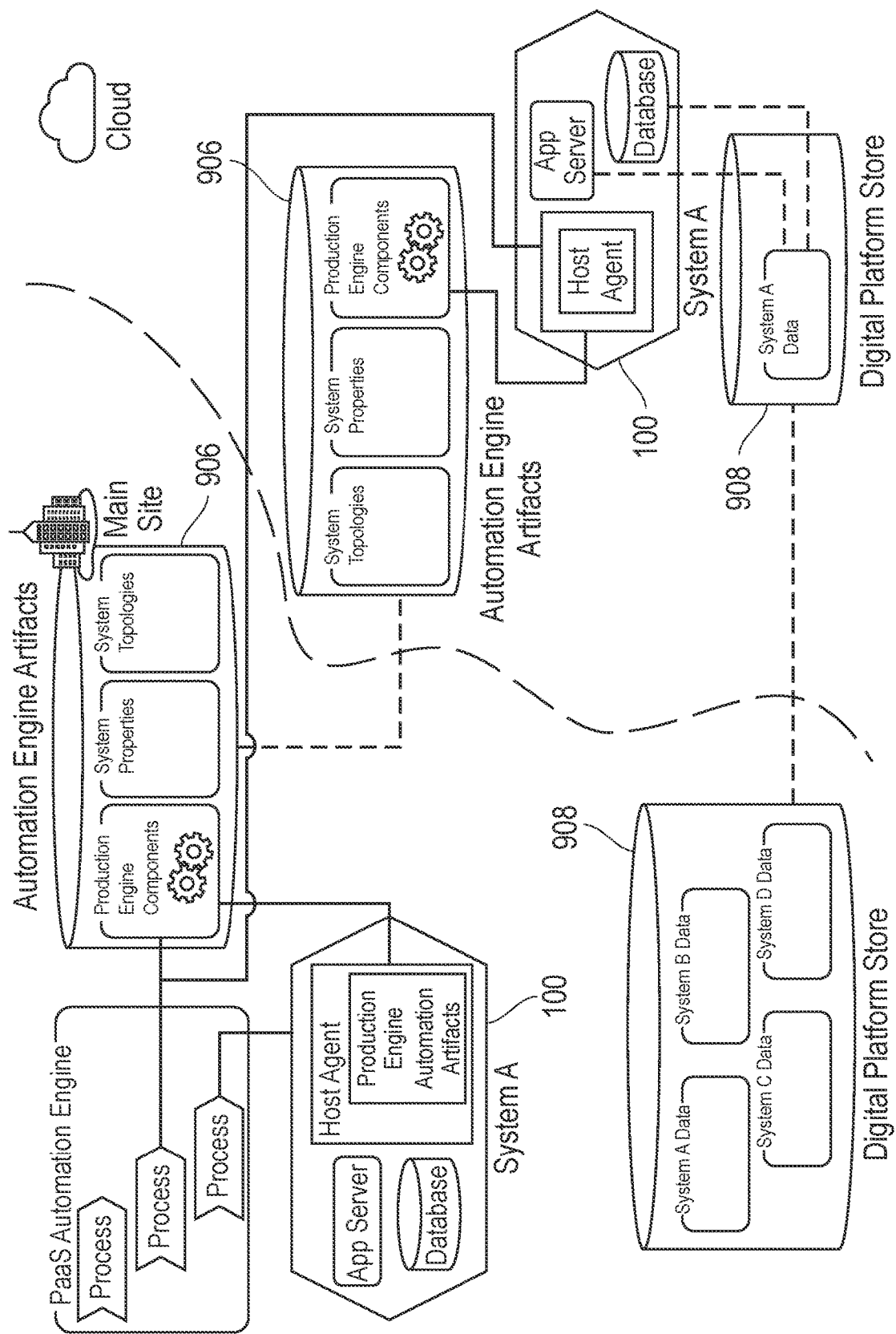
Figure 30A:
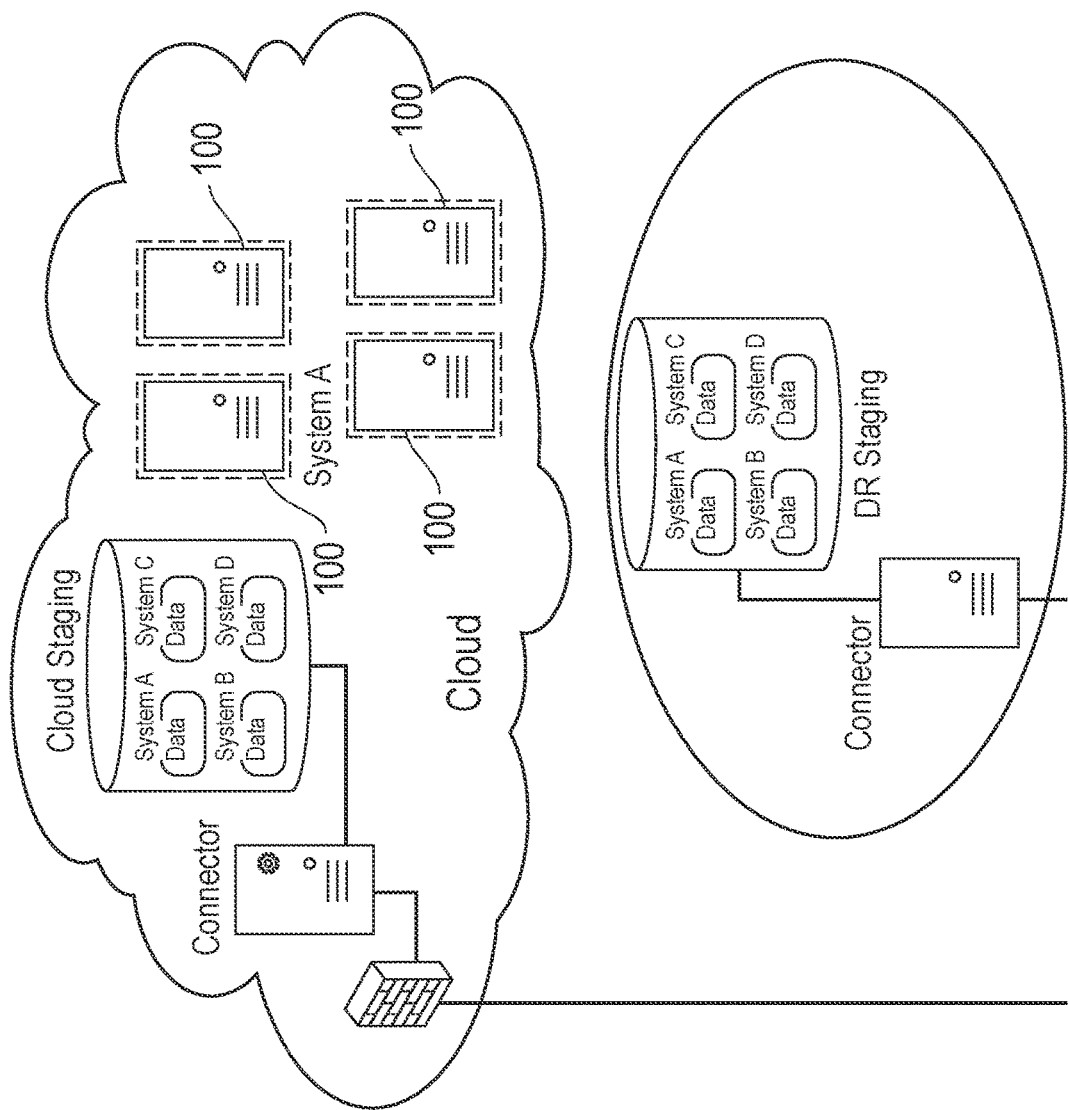
Figure 30B:
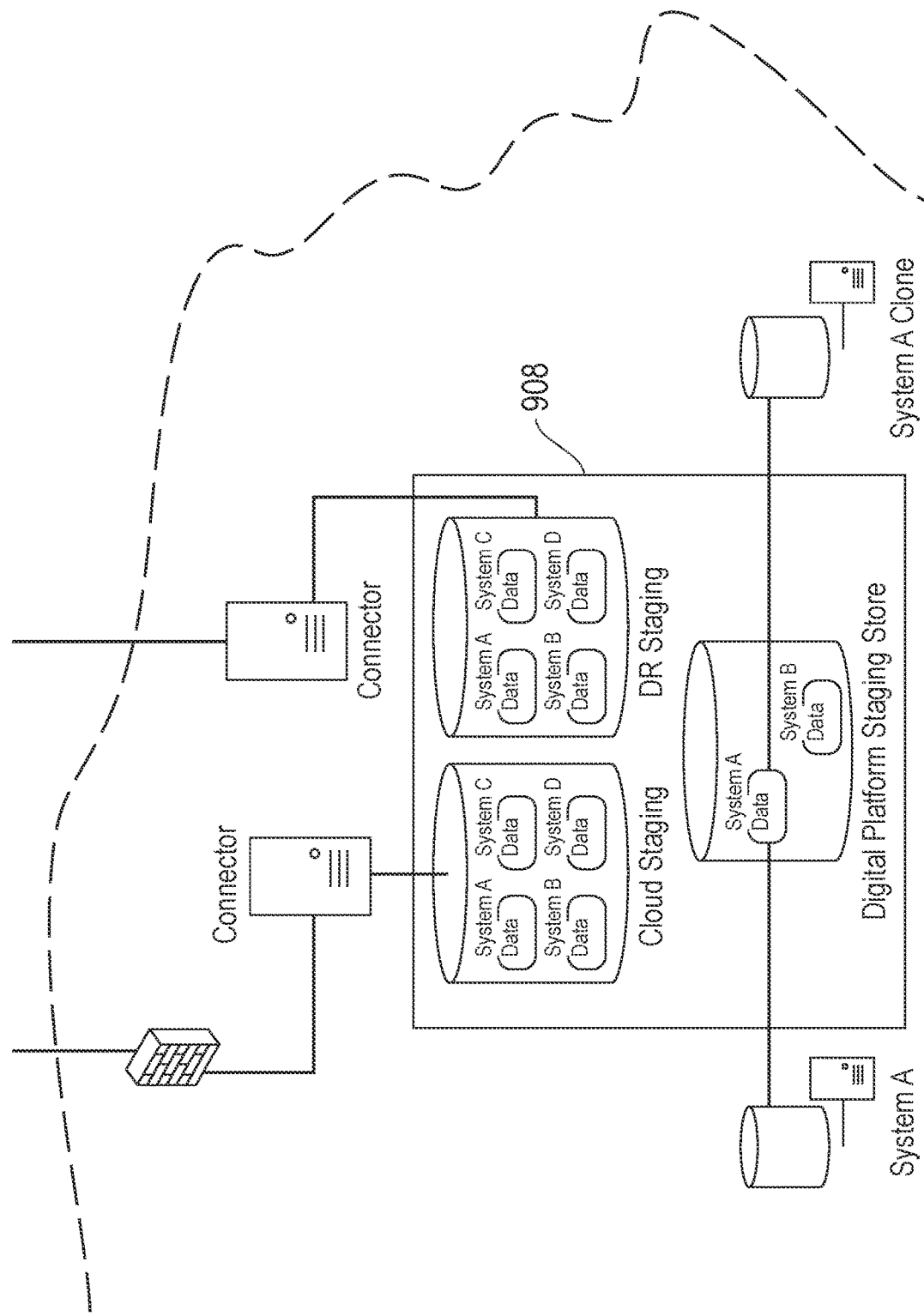

FIG. 29 illustrates an implementation of the present disclosure regarding a migration to a cloud-based target. In cases involving a long-term migration, such as shown in FIGS. 29 and 30, a PaaS automation engine 902 may not be available at the cloud target site.

Figure 31:
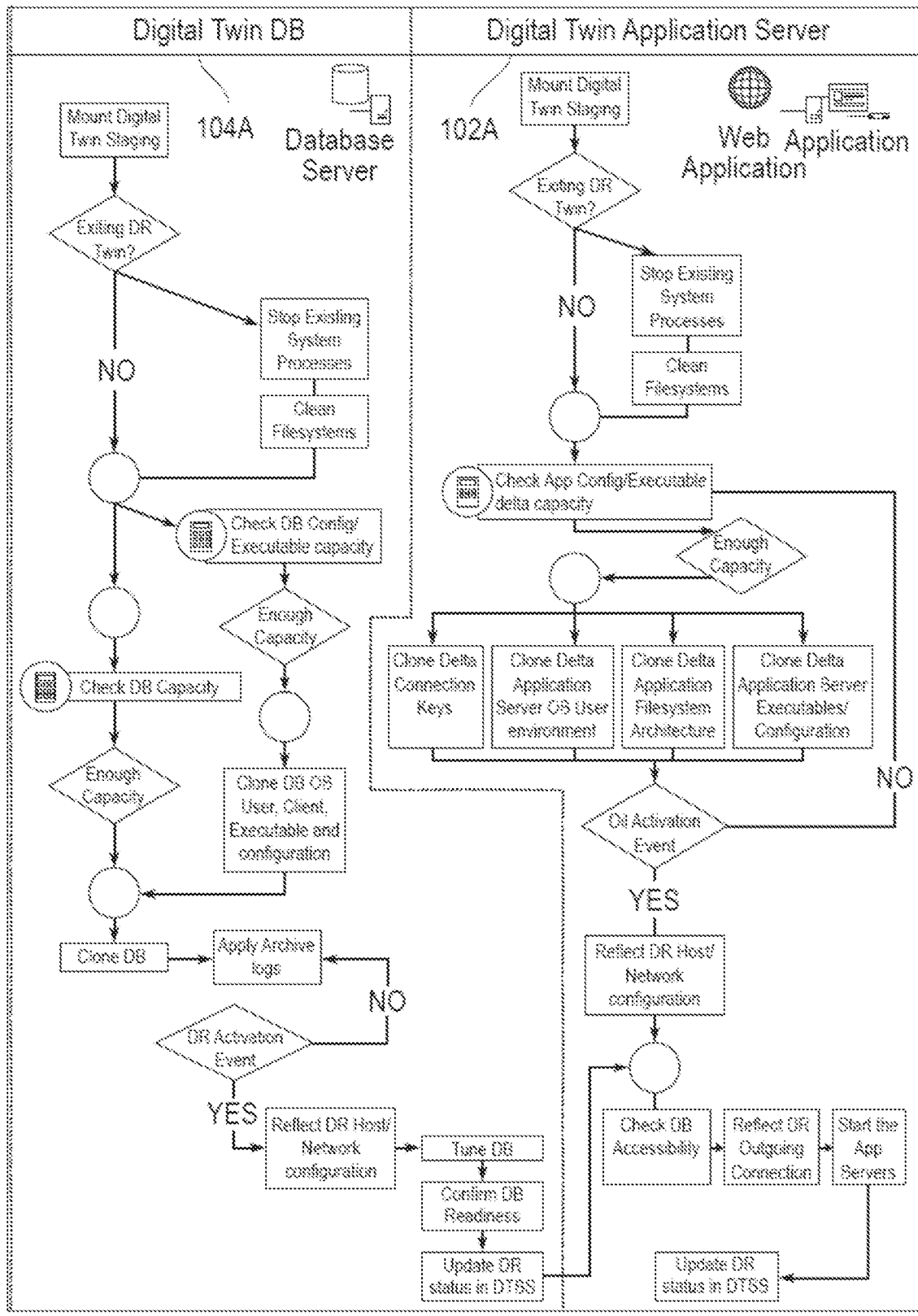

FIG. 31 illustrates an implementation of the present disclosure including a digital twin database and a digital twin application server at a DR site. In the example shown in FIG. 31, a digital twin in DR site remains in a cloning state, and various steps to maintain syncing between local and DR sites are augmented in the DR site. For example, redo logs can be applied continuously once received by the DR database platform. In such instances, source sub-processes track when application server files change and automatically transmit the changes to a DR digital twin staging store 908. Sub-processes in the in the DR digital twin staging store 908 implement the changes reflected in the changed files and for a DR host.

In particular instances, information representing a DR activation event, such as representing a network or capacity configuration, is received. In such case, DR configurations are applied that correspond to the received activation event. Once instantiated, readiness of the database in the DR host is verified and the database can be started. Thereafter, in cases where the application server depends on database availability, the application server in the DR host can be started. Moreover, connections at application server level can be updated to represent the DR environment as configured pursuant to the received activation event.

In one or more implementations of the present disclosure, one or more digital twins can be generated simultaneously (see, for example, FIG. 8). Implementations involving multiple destinations, such as for test or training environments, can include PaaS automation engine 902 mounting the digital twin staging store 908 in a plurality of destination servers. Generally, digital twin components can be grouped as systems and respective specifications for the systems that are associated with the same source system can be specified as input parameters for each twin. Specific parameters can be passed to generate a digital twin of an application server and, for parallel generation, source system details can be provided as parameters. A digital twin can be generated in different hosts or within a single host and distinguished by names, which can be reflected in the filesystems of the digital twin hosts, and ports. For example, parameters can be defined for source and target security identifiers, one or more shared directories, target database hostname and port, one or more schemas, and NFS server and path.

As shown and described herein, such parameters can be stored as templates in a digital twin automation engine artifacts store 906. Moreover, metadata can be generated and stored to represent the status, progress, or other characteristics of respective digital twin generation processes. In particular implementations, a digital twin server sequential restore process originates from a central backup and can depend on central backup parallel processing capabilities, although restoration processes from the digital twin staging store 908 can read and process backups from multiple servers in parallel. Variables such as storage system capabilities, network bandwidth and NFS server performance can be evaluated and used to determine sequential versus parallel processing.

In one or more implementations of the present disclosure, a central backup system can be used by source and target hosts to generate a clone of a system. For example, a backup job of the source files can be saved in a central backup system. PaaS automation engine 902 can log successful completion of the backup from the source in digital twin staging store 908. This triggers a restoration by digital twin servers which read datafiles and redologs from central backup. In an embodiment of this invention, central backup is supported based on availability and performance of the technology. Alternative option is to rely on a dedicated digital twin staging store 908 as a convenient option especially if central backup is used by the data center for daily backup jobs for all systems in the datacenter in order to protect data. The process could take longer time using central backup system due to the fact that central backup system is used for other purposes beside cloning and digital twin purposes in datacenters.

Accordingly, the processes associated with generating a digital twin are affected via computing systems having a modular design. The architecture of the present disclosure supports augmentation to handle specific requirements and timeframes for respective source or target systems, including partial processing of a source or target system. For example, a twin image can be prepared in a digital twin staging store 908 and stored for future use by another zone or twin, pursuant to respective implementations.

Thus, as shown and described herein, single-cloud or multi-cloud migration from a host system to one or more target systems can be provided by the present disclosure. For example, a digital twin having identical or semi-identical characteristics of a source is created in a cloud-based is different from the source. In such instances, a digital twin can be generated and synced with the source and, upon successful activation, operations switched to the digital twin cloud-based system. Digital twin generation is optimized and improved in accordance with the present disclosure, including by configuring PaaS automation engine 902 with features and functions, shown and described herein. The PaaS automation engine 902 orchestrates operations between source and target systems, including via a modular design that supports extensibility for particular use and digital platform environments in previously undefined and unavailable ways.

Moreover, the present disclosure overcomes known shortcomings, including dependency on specific hypervisor virtualization, container cluster (e.g., OPENSHIFT) or various specific PaaS technology. Virtualized and physical appliances can be supported by the teachings herein, as well as via container-based solutions that support imaging of complex systems.

The present disclosure solves technical problems, including to automate complex processes that heretofore required manual implementations for generating digital twins, including building a DR site, as well as activating and rebuilding digital twins therein. The present disclosure improves the cost, time, and flexibility of digital twin generation and use, including by overcoming limitations of solutions requiring storage-based snapshots. The present disclosure overcomes previous segregation of duties in managing and controlling hypervisor operations via the features and functions shown and described herein. The present disclosure further supports parallel generation of twins in multiple heterogenous cloud-based environments, and without negatively impacting production system operations and availability.

More particularly, various features shown and described herein, such as Paas automation engine 902, digital twin automation engine artifacts store 906, and digital twin staging store 908, enable and/or significantly improve multi-cloud digital twin staging realms and support event monitoring, generating and supporting semi-identical digital twins, Unicode conversion, API calls, automation artifacts, mixed legacy and cloud-based environments, virtual machine provisioning, and security. Other technical advantages of the present disclosure include reducing production system degradation at the operating system, database, or application levels, as well as reducing unintended side effects that otherwise occur in host systems following introduction of new features and functionality or by decommissioning some or all of various systems. The present disclosure further supports migrations to and from physical and virtual computing systems, as well as providing for secure staging that isolates codes, packages, and configurations from different environments and virtualization technologies, which can be locally replicated in target host systems.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device." as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one application and/or at least one computer. The database can include a structured collection of records or data organized according to a database model, such as, for example, but not limited to at least one of a relational model, a hierarchical model, a network model or the like. The database can include a database management system application (DBMS) as is known in the art. The at least one application may include, but is not limited to, for example, an application program that can accept connections to service requests from clients by sending back responses to the clients. The database can be configured to run the at least one application, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one application and/or at least one computer to perform services for connected clients as part of a client-server architecture. The at least one server application can include, but is not limited to, for example, an application program that can accept connections to service requests from clients by sending back responses to the clients. The server can be configured to run the at least one application, often under heavy workloads, unattended, for extended periods of time with minimal human direction. The server can include a plurality of computers configured, with the at least one application being divided among the computers depending upon the workload. For example, under light loading, the at least one application can run on a single computer. However, under heavy loading, multiple computers can be required to run the at least one application. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, including as indicated by a respective reference numeral, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The present disclosure has been described with reference to the accompanying drawings, which form a part hereof, and which show, by way of illustration, example implementations. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one implementation" as used herein does not necessarily refer to the same embodiment and the phrase "in one or more implementations" as used herein does not necessarily refer to different implementations. It is intended, for example, that claimed subject matter can be based upon combinations of individual example implementations, or combinations of parts of individual example implementations.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the disclosure is to be understood as being defined by the recitations in the claims which follow and structural and functional equivalents of the features and steps in those recitations.

What is claimed:

1. A method for automating generation of a digital twin of an enterprise-wide information technology platform, the method comprising:
    receiving, at a platform as a service ("PaaS") automation engine over a network, a request to generate a digital twin of a source computing system;
    mounting, by the PaaS automation engine, the source computing system for on demand access to at least part of the source computing system;
    accessing, by the PaaS automation engine, parameter information representing aspects of the source computing system and the digital twin;
    replicating, by the PaaS automation engine processing the parameter information, at least application programming comprised in the source computing system;
    migrating, by the PaaS automation engine, the replicated application programming to a digital twin staging store associated with the digital twin;
    providing, by the PaaS automation engine, the replicated application programming to the digital twin;
    identifying, by the PaaS automation engine processing the parameter information, a delta between the replicated application programming and the source computing system;
    updating, by the PaaS automation engine processing the delta, the application programming of the digital twin;
    providing to the digital twin, by the PaaS automation engine, data associated with at least part of the source computing system; and
    unmounting, by the PaaS automation engine, the source computing system.

2. The method of claim 1, further comprising:
    accessing, by the PaaS automation engine, an automation engine artifacts store that provides at least one of repositories of software packages, components, templates, parameters, and status information associated with at least one of the source computing system and the digital twin,
    wherein replicating the application programming includes extracting the application programming, by the PaaS automation engine, from at least one of the software packages.

3. The method of claim 2, further comprising:
    accessing, by the PaaS automation engine, at least one of the templates provided by the automation engine artifacts store; and
    processing, by the PaaS automation engine, the at least one of the templates to generate the digital twin,
    wherein at least one of the parameters represents or is associated with the delta.

4. The method of claim 2, further comprising:
    determining, by the PaaS automation engine, a size of at least one of the software packages, components, templates, parameters, and status information associated with the source computing system;
    identifying, by the PaaS automation engine, capacity of a target host of the digital twin; and
    determining, by the PaaS automation engine that the target host has sufficient capacity to host the digital twin,
    wherein the replicated application programming is only provided by the PaaS automation engine to the digital twin after determining that the target host has the sufficient capacity.

5. The method of claim 2, further comprising:
    determining, by the PaaS automation engine, that executing the replicated application programming with an existing or executing component of the digital twin or a target host of the digital twin presents no conflict,
    wherein the replicated application programming and the data is only provided by the PaaS automation engine to the digital twin after determining no conflict.

6. The method of claim 2, wherein mounting the source computing system for on demand access comprises:
    accessing, by the PaaS automation engine, the parameter information provided by the automation engine artifacts store; and
    passing, by the PaaS automation engine, the parameter information to a host agent associated with the source computing system, wherein the host agent uses the parameter information to provide the on demand access from the source computing system.

7. The method of claim 1, wherein migrating the replicated application programming and providing the data comprises:
    migrating an application server to the digital twin; and
    independently migrating a database server to the digital twin.

8. The method of claim 1, wherein:
    the source computing system is physically hosted and the digital twin is virtually hosted;
    the source computing system is virtually hosted and the digital twin is physically hosted; or
    the source computing system is cohosted on a plurality of computing devices.

9. The method of claim 1, further comprising:
    providing to the digital twin staging store, by the PaaS automation engine via at least one respective connector, at least one of environment variables, configuration files, source system files structure, database topology, database metadata, database change number, and database data files.

10. The method of claim 1, further comprising replicating, by the PaaS automation engine, the digital twin by:
    mounting, by the PaaS automation engine, the digital twin for on demand access to at least part of the digital twin;
    accessing, by the PaaS automation engine, parameter information representing aspects of the digital twin;

replicating, by the PaaS automation engine processing the parameter information, at least application programming comprised in the digital twin;

migrating, by the PaaS automation engine, the replicated application programming to at least one other digital twin staging store associated with another digital twin;

providing, by the PaaS automation engine, the replicated application programming to the at least one other digital twin;

identifying, by the PaaS automation engine processing the parameter information, a delta between the replicated application programming and the digital twin;

updating, by the PaaS automation engine processing the delta, the application programming of the at least one other digital twin;

providing, by the PaaS automation engine, data associated with at least part of the digital twin to the at least one other digital twin; and unmounting, by the PaaS automation engine, the digital twin.

11. A system for automating generation of a digital twin of an enterprise-wide information technology platform, the system comprising:

an automation engine, comprising at least one computing device configured by executing programming instructions stored on non-transitory processor readable media to:

receive, over a network, a request to generate a digital twin of a source computing system;

mount the source computing system for on demand access to at least part of the source computing system;

access parameter information representing aspects of the source computing system and the digital twin;

replicate, by processing the parameter information, at least application programming comprised in the source computing system;

migrate the replicated application programming to a digital twin staging store associated with the digital twin;

provide the replicated application programming to the digital twin;

identify, by processing the parameter information, a delta between the replicated application programming and the source computing system;

update, by processing the delta, the application programming of the digital twin;

provide, to the digital twin, data associated with at least part of the source computing system; and unmount the source computing system.

12. The system of claim 11, wherein the automation engine is further configured by executing programming instructions stored on non-transitory processor readable media to:

access an automation engine artifacts store that provides at least one of repositories of software packages, components, templates, parameters, and status information associated with at least one of the source computing system and the digital twin, wherein replicating the application programming includes extracting the application programming, by the PaaS automation engine, from at least one of the software packages.

13. The system of claim 12, wherein the automation engine is further configured by executing programming instructions stored on non-transitory processor readable media to:

access at least one of the templates provided by the automation engine artifacts store; and process the at least one of the templates to generate the digital twin, wherein at least one of the parameters represents or is associated with the delta.

14. The system of claim 12, wherein the automation engine is further configured by executing programming instructions stored on non-transitory processor readable media to:

determine a size of at least one of the software packages, components, templates, parameters, and status information associated with the source computing system;

identify capacity of a target host of the digital twin; and determine that the target host has sufficient capacity to host the digital twin, wherein the replicated application programming is only provided by the PaaS automation engine to the digital twin after determining that the target host has the sufficient capacity.

15. The system of claim 12, wherein the automation engine is further configured by executing programming instructions stored on non-transitory processor readable media to:

determine that executing the replicated application programming with an existing or executing component of the digital twin or a target host of the digital twin presents no conflict, wherein the replicated application programming and the data is only provided by the PaaS automation engine to the digital twin after determining no conflict.

16. The system of claim 12, wherein mounting the source computing system for on demand access comprises:

accessing, by the PaaS automation engine, the parameter information provided by the automation engine artifacts store;

passing, by the PaaS automation engine, the parameter information to a host agent associated with the source computing system, wherein the host agent uses the parameter information to provide the on demand access from the source computing system.

17. The system of claim 11, wherein migrating the replicated application programming and providing the data comprises:

migrating an application server to the digital twin; and independently migrating a database server to the digital twin.

18. The system of claim 11, wherein:

the source computing system is physically hosted and the digital twin is virtually hosted;

the source computing system is virtually hosted and the digital twin is physically hosted; or the source computing system is cohosted on a plurality of computing devices.

19. The system of claim 11, wherein the automation engine is further configured by executing programming instructions stored on non-transitory processor readable media to:

provide to the digital twin staging store, via at least one respective connector, at least one of environment variables, configuration files, source system files structure, database topology, database metadata, database change number, and database data files.

20. The method of claim 11, wherein the automation engine is further configured by executing programming instructions stored on non-transitory processor readable media to replicate the digital twin by:

mounting the digital twin for on demand access to at least part of the digital twin;
accessing, parameter information representing aspects of the digital twin;
replicating, by processing the parameter information, at least application programming comprised in the digital twin;
migrating the replicated application programming to another digital twin staging store associated with another digital twin;
providing the replicated application programming to the other digital twin;
identifying, by processing the parameter information, a delta between the replicated application programming and the digital twin;
updating, by processing the delta, the application programming of the other digital twin;
providing data associated with at least part of the digital twin to the other digital twin; and
unmounting the digital twin.

* * * * *